United States Patent
Furukawa et al.

(10) Patent No.: US 7,554,936 B2
(45) Date of Patent: Jun. 30, 2009

(54) RADIO NETWORK, RELAY NODE, CORE NODE, RELAY TRANSMISSION METHOD USED IN THE SAME AND PROGRAM THEREOF

(75) Inventors: Hiroshi Furukawa, Tokyo (JP); Morihisa Momona, Tokyo (JP); Koichi Ebata, Tokyo (JP)

(73) Assignee: NEC Corporation (JP)

( * ) Notice: Subject to any disclaimer, the term of this patent is extended or adjusted under 35 U.S.C. 154(b) by 585 days.

(21) Appl. No.: 11/214,985

(22) Filed: Aug. 31, 2005

(65) Prior Publication Data

US 2005/0286458 A1 Dec. 29, 2005

Related U.S. Application Data

(62) Division of application No. 09/942,408, filed on Aug. 29, 2001, now Pat. No. 7,035,221.

(30) Foreign Application Priority Data

| Aug. 30, 2000 | (JP) | ............................. 2000-260051 |
| Dec. 20, 2000 | (JP) | ............................. 2000-386207 |
| Apr. 25, 2001 | (JP) | ............................. 2001-126851 |
| Jul. 18, 2001 | (JP) | ............................. 2001-217426 |

(51) Int. Cl.
*H04J 3/08* (2006.01)
*H04L 12/56* (2006.01)

(52) U.S. Cl. ......................... 370/315; 370/329; 370/430

(58) Field of Classification Search ......... 370/315–327, 370/339, 329, 430; 455/115; 709/228
See application file for complete search history.

(56) References Cited

U.S. PATENT DOCUMENTS 5,412,654 A 5/1995 Perkins
5,515,509 A * 5/1996 Rom ........................... 709/228
5,666,653 A 9/1997 Ahl (Continued)

FOREIGN PATENT DOCUMENTS

GB 2 334 180 A 8/1999

(Continued)

OTHER PUBLICATIONS

Japanese Office Action dated Apr. 25, 2006 (and English translation of relevant portion).

(Continued)

*Primary Examiner*—John Pezzlo
(74) *Attorney, Agent, or Firm*—Dickstein, Shapiro, LLP.

(57) ABSTRACT

A radio network can select a route of minimum path loss among entire relay routes and can set the relay route so as to satisfactorily resist interference. The radio network has a core node connected to a wired network, relay nodes each relaying at least one of a down-link data packet transmitted from the core node and an up-link data packet directed toward the core node, and a terminal station capable of transmission and reception of data packets with both the core node and the relay node. The relay node has total path loss optimized to be minimum between relay nodes included in a relay route of the data packet or between the relay node and the core node or both.

14 Claims, 16 Drawing Sheets

U.S. PATENT DOCUMENTS

| | | | |
|---|---|---|---|
| 5,987,011 A * | 11/1999 | Toh | 370/331 |
| 6,810,428 B1 | 10/2004 | Larsen et al. | |
| 2001/0049270 A1 * | 12/2001 | Pekkarinen et al. | 455/115 |
| 2005/0186933 A1 * | 8/2005 | Trans | 455/296 |
| 2006/0215605 A1 * | 9/2006 | Srikrishna et al. | 370/329 |

FOREIGN PATENT DOCUMENTS

| | | |
|---|---|---|
| JP | 6-181452 A | 6/1994 |
| JP | 8-37535 | 2/1996 |
| JP | 8-102708 | 4/1996 |
| JP | 8-167871 A | 6/1996 |
| JP | 10-257009 | 9/1998 |
| JP | 11-234307 | 8/1999 |
| JP | 11-284567 A | 10/1999 |
| JP | 2002-515715 | 5/2002 |
| JP | 2002-199431 | 7/2002 |
| WO | WO 95/11561 | 4/1995 |
| WO | WO-95/11561 | 4/1995 |
| WO | WO-99/59367 | 11/1999 |
| WO | WO 99/59367 | 11/1999 |
| WO | WO 00/14933 | 3/2000 |

OTHER PUBLICATIONS

C. Roobol, "Multihop Radio Networks In Random Terrains: Connectivity And Some Terrain Adaptive Routing Algorithms," Millitary Communications Conference, 1993, IEEE Boston, MA, Oct. 11-14, 1993, pp. 428-431.

S. Kurosaki, et al., "A smart multiple sector antennas control technique for a high-speed ATM wireless access system using 25-GHz band," Vehicular Technology Conference, 1999 IEEE 49th Houston, TX, May 16-20, 1999, pp. 458-462.

Y. Shen et al., "Millimeter Wave Line-of-Sight Digital Radio at 38 GHz," 1997 Asia Pacific Microwave Conference, Torrance, CA, pp. 21-25.

Japanese Office Action issued Apr. 26, 2005 (w/ English translation of relevant portions).

"Universal Mobile Telecommunications System (UMTS); Utran Overall Description (3F TS 25.401 Version 3.3.0 Release 1999)" ETSI TS 125 401 V3. 3.0 (1999), pp. 1, 1-36.

Y. Shen, et al., "Millimeter Wave Line-of Sight Digital Radio at 38 GHz," 1997 Asia Pacific Microwave Conference, pp. 21-24.

Kurosaki S., et al., "A Smart Multiple Sector Antennas Control Technique for a High-Speed ATM Wireless Access System Using 25-GHz Band," Vehicular Technology Conference, IEEE, May 16-20, 1999, pp. 458-462.

Roobol, C., "Multihop Radio Networks In Randon Terrains: Connectivity And Some Terrain Adaptive Routing Algorithms" Military Communications Conference 1993, MILCOM '93, Conference Record, IEEE Boston, MA Oct. 11-14, 1993, pp. 428-1993.

Meinel, H.H., "Recent Advances On Millimeterwave Pcn System Development In Europe—An Invited Survey," Microwave Symposium Digest, 1995, Orlando FL, May 16-20, 1995, pp. 401-404.

European Search Report dated Apr. 5, 2004.

Japanese Office Action issued Jun. 15, 2004 (w/ English translation of relevant portions).

* cited by examiner

FIG.7

| DOWN-LINK RECEIVER SIDE RELAY NODE ID |
|---|
| B S − a |
| B S − c |
| B S − f |
| ⋮ |

FIG.8

| OTHER | RECEIVER SIDE RELAY NODE ID | SENDER SIDE RELAY NODE ID | DESTINATION TERMINAL ID | DATA |
|---|---|---|---|---|
| C01 | C02 | C03 | C04 | C05 |

RADIO NETWORK, RELAY NODE, CORE NODE, RELAY TRANSMISSION METHOD USED IN THE SAME AND PROGRAM THEREOF

CROSS REFERENCE TO RELATED APPLICATIONS

This application is a Divisional of application Ser. No. 09/942,408, filed Aug. 29, 2001, entitled RADIO NETWORK, RELAY NODE, CORE NODE, RELAY TRANSMISSION METHOD USED IN THE SAME AND PROGRAM THEREOF, the entire disclosure of which is incorporated herein by reference.

BACKGROUND OF THE INVENTION

1. Field of the Invention

The present invention relates generally to a radio network, a relay node, a core node, a relay transmission method used in the same and a program thereof. More particularly, the invention relates to a relay route setting method and a relay transmission method in a cellular system, in which a plurality of nodes are connected by a radio network.

2. Description of the Related Art

A cell structure in the conventional cellular system is illustrated in FIG. 20. In FIG. 20, the reference numeral 401 denotes a cell and 402 denotes a base station (node). As shown in FIG. 20, a service area is constructed by arranging a plurality of cells.

Each node is connected to a wired backbone network 404 through wire lines 403 for transmitting service signals, such as voice, data and so forth and various control signals. It should be noted that the node and the wired backbone network may be connected by hierarchically providing line concentration stations there-between.

A terminal station 405 communicates with a node 402 for performing transmission and reception of various signals to be transmitted by a wired backbone network 404 through wire lines 403. In the wired backbone network, not only the radio base station (node), but also server equipment provide a management of position information of the terminal station 405, a billing process and so forth.

In order to increase numbers of subscribers of a cellular system, such as a cellular telephone system, a subscriber fixed wireless access and so forth, the radius of each cell is reduced, thus reducing the process load in each node. When the system is constructed with such micro cells, quite a large number of nodes are arranged in order to reliably establish the service area.

On the other hand, when a high density data transmission method of multi-value modulation or the like is applied for adapting to a high speed data transmission, the service area to be covered by one node inherently becomes narrow for providing reliable quality. Even in such a case, quite a large number of nodes have to be arranged for reliably establishing the service area.

Furthermore, although the conventional cellular system has been mainly designed in a quasi-microwave band and microwave band, due to tightness of frequencies, it is desirable to establish the cellular system using submillimeter wave or millimeter wave. When frequency becomes higher, diffraction effect of the radio wave is reduced to make straightening characteristics significant, and it causes difficulty in non line-of-sight communication to inherently narrow the area of service in each node. Namely, even in such a case, the service area has to be established with micro cells to install quite a large number of nodes.

When a system is established with a large number of micro cells, it becomes essential to establish a wired network for connecting the node group to the backbone network. However, in order for a connection between a large number of geographically concentrated nodes and the backbone network, wire line networks have to be extended to every place, thus inherently increasing the cost of the overall system. Therefore, there is a method to establish the connection between nodes with wireless communication for relay transmission to expand the service area.

Setting of the relaying method dominates a capacity because capacity of the cellular system is restricted by interference, and tolerance of interference depends upon the setting of the relaying. In a route method that decreases the number of relay nodes, the so-called "minimum hop routing" method, throughput or system capacity cannot be always at maximum relaying route for lacking of reception power due to the distance between relay nodes and obstacles.

For achieving improvement of throughput and large circuit capacity of the overall system, a method of setting the relay route becomes important. However, heretofore, there is no relay route setting method specialized for a radio relay transmission type cellular system in a configuration where a core node is arranged with a large number of micro cells and is connected to the wired backbone network thereby solving a problem of interference between the cells which causes problem in the cellular system.

SUMMARY OF THE INVENTION

The present invention addresses the problem set forth above. It is therefore an object of the present invention to provide a radio network, a relay node, a core node, a relay transmission method used in the same and a program thereof, which can select a route of minimum path loss among entire relay routes, and can set the relay route to resist satisfactorily resist interference.

According to the first aspect of the present invention, a radio network comprises:

a core node connected to a wired network;

relay nodes each relaying at least one of a down-link data packet transmitted from the core node and an up-link data packet directed toward the core node;

a terminal station capable of transmission and reception of data packets with both of the core node and the relay node, the relay node having a total transmission loss that is optimized to be minimum between one or the other of relay nodes included in a relay route of the data packet and between the relay node and the core node.

According to the second aspect of the present invention, a radio network comprises:

a core node connected to a wired network; relay nodes each relaying at least one of a down-link data packet transmitted from the core node and an up-link data packet directed toward the core node;

a terminal station capable of transmission and reception of data packets with both the core node and the relay node, the relay node relaying the up-link data packet to another one of the up-link relay nodes and the core node when the up-link data packet addressed to an own node is received and relaying a down-link data packet to at least one down-link relay node when the down-link data packet address to the own node is received.

According to the third aspect of the present invention, a radio network comprises:

a relay node which forgets all of update metrics corresponding to the route setting packets received in the past and relays a ner route setting packet taking the update metric corresponding to the currently received route setting packet as net metric, when a sender node identification information contained in the received route setting packet matches a current up-link receiver side relay node.

According to the fourth aspect of the present invention, a radio network comprises:

a core node connected to a wired network;

relay nodes each relaying at least one of a down-link data packet transmitted from the core node and an up-link data packet directed toward the core node;

a terminal station capable of transmission and reception of data packet with both of the core node and the relay node, a radio frequency band to be used in relaying to be performed between the core node and the relay node and between the relay nodes and a radio frequency band to be used in access transmission to be performed between the core node and the terminal station and between the relay node and the terminal station, are different, and the radio frequency band to be used in relaying is higher than the radio frequency band to be used in the access transmission.

According to the fifth aspect of the present invention, a relay node relaying at least one of a down-link data packet transmitted from the core node and an up-link data packet directed toward the core node, and capable of communication with a terminal station, comprises:

an antenna for access transmission; an antenna for relaying;

a radio system for access transmission; and a radio system for relaying, a radio frequency band to be used in relaying to be performed between the core node and a radio frequency band to be used in access transmission to be performed between the terminal station, are different, and the radio frequency band to be used in relaying is higher than the radio frequency band to be used in the access transmission.

According to the sixth aspect of the present invention, a relay node relaying at least one of a down-link data packet transmitted from the core node and an up-link data packet directed toward the core node, and capable of communication with a terminal station, selecting relay nodes for making a total path loss in a relay route of the data packet minimum from own node to the core node.

According to the seventh aspect of the present invention, a relay node relaying at least one of a down-link data packet transmitted from the core node and an up-link data packet directed toward the core node, and capable of communication with a terminal station, relaying the up-link data packet to other one of up-link relay node and the core node when the up-link data packet addressed to own node is received and relaying a down-link data packet to at least one down-link relay node when the down-link data packet address to the own node is received.

According to the eighth aspect of the present invention, a relay node relaying at least one of a down-link data packet transmitted from the core node and an up-link data packet directed toward the core node, and capable of communication with a terminal station, a radio frequency band to be used in relaying to be performed between the core node and the relay node and between the relay nodes and a radio frequency band to be used in access transmission to be performed between the core node and the terminal station and between the relay node and the terminal station, are different, and the radio frequency band to be used in relaying is higher than the radio frequency band to be used in the access transmission.

According to the ninth aspect of the present invention, a core node capable of transmission and reception of data packet with either a relay node perform radio relaying and a terminal station, and connected to a wired network, comprises: an antenna for access transmission;

an antenna for relaying;

a radio system for access transmission;

a radio system for relaying; and a signal distributor connected to a wired backbone network, a radio frequency band to be used in relaying to be performed between the relay node and a radio frequency band to be used in access transmission to be performed between the terminal station, are different, and the radio frequency band to be used in relaying is higher than the radio frequency band to be used in the access transmission.

According to the tenth aspect of the present invention, a core node connected to a wired network, being relayed at least one of a down-link data packet transmitted from own node and an up-link data packet directed toward own node, and capable of transmission and reception of data packet with a terminal station, transmits a route setting packet including a metric indicative of an amount providing indicia for selecting a sender identification information, an up-link receiver side relay node information and a receiver side relay node, to the relay node.

According to the eleventh aspect of the present invention, a core node connected to a wired network, being relayed at least one of a down-link data packet transmitted from own node and an up-link data packet directed toward own node, and capable of transmission and reception of data packet with a terminal station, a radio frequency band to be used in relaying to be performed between the core node and a radio frequency band to be used in access transmission to be performed between the terminal station, are different, and the radio frequency band to be used in relaying is higher than the radio frequency band to be used in the access transmission.

According to the twelfth aspect of the present invention, a relaying method for a radio network including a core node connected to a wired network, relay nodes each relaying at least one of a down-link data packet transmitted from the core node and an up-link data packet directed toward the core node, and a terminal station capable of transmission and reception of data packet with both of the core node and the relay node, comprises the step of:

selecting the relay node having total path loss to be minimum at least one of between relay nodes includes in a relay route of the data packet and between the relay node and the core node.

According to the thirteenth aspect of the present invention, a relaying method for a radio network including a core node connected to a wired network, relay nodes each relaying at least one of a down-link data packet transmitted from the core node and an up-link data packet directed toward the core node, and a terminal station capable of transmission and reception of data packet with both of the core node and the relay node, comprises steps of:

relaying the up-link data packet to other one of up-link relay node and the core node when the up-link data packet addressed to own node is received and relaying a down-link data packet to at least one down-link relay node when the down-link data packet address to the own node is received.

According to the fourteenth aspect of the present invention, a relaying method comprises:

a relay node which forgets all of update metrics corresponding to the route setting packets received in the past and relays a new route setting packet taking the update metric corresponding to the currently received route setting packet as net metric, when a sender node identification information contained in the received route setting packet matches a current up-link receiver side relay node.

According to the fifteenth aspect of the present invention, a relaying method for a system including core node connected to a wired network, relay nodes each relaying at least one of a down-link data packet transmitted from the core node and an up-link data packet directed toward the core node, and a terminal station capable of transmission and reception of data packet with both of the core node and the relay node, a radio frequency band to be used in relaying to be performed between the core node and the relay node and between the relay nodes and a radio frequency band to be used in access transmission to be performed between the core node and the terminal station and between the relay node and the terminal station, are different, and the radio frequency band to be used in relaying is higher than the radio frequency band to be used in the access transmission.

According to the sixteenth aspect of the present invention, a relaying method for a radio network including a core node connected to a wired network, relay nodes each relaying at least one of a down-link data packet transmitted from the core node and an up-link data packet directed toward the core node, and a terminal station capable of transmission and reception of data packet with both of the core node and the relay node, comprises:

step of detecting arrival of a route setting packet including a sender node identification information, an up-link receiver side relay node information and a metric indicative of an amount providing an indicia for selecting the receiver side relay node;

step of making judgment whether the up-link receiver side relay node indicates own node or not upon detection of arrival of the route setting packet;

step of recording a node indicated by the sender node identification information contained in the route setting packet in a relay node list when judgment is made that the up-link receiver side information indicates own node;

step of taking a measured path loss upon judgment that the up-link receiver side node relay node information does not indicative own node, as path loss Ln (n is unique number of a sender node of the route setting packet) between the node transmitting the route setting packet and the own node;

step of reading the metric Mr.n contained in the route setting packet;

step of calculating and storing an update metric from the path loss Ln and the metric Mr.n;

step of comparing the update metric Mn with the update metric corresponding to the route setting packet received in the past for making judgment whether the update metric Mn is minimum;

step of setting the update metric Mn to a metric contained in the metric of the route setting packet and registering the node indicated by the sender node identification information of the currently arrived route setting packet as the up-link receiver side relay node when the update metric Mn is judged as minimum; and step of transmitting a route setting packet containing the transmission metric M as the metric, sender node identification information indicating identification information of own node and the up-link receiver side relay node information.

According to the seventeenth aspect of the present invention, a relaying method for a radio network including a core node connected to a wired network, relay nodes each relaying at least one of a down-link data packet transmitted from the core node and an up-link data packet directed toward the core node, and a terminal station capable of transmission and reception of data packet with both of the core node and the relay node, comprises:

step of detecting arrival of a route setting packet including a sender node identification information, an up-link receiver side relay node information and a metric indicative of an amount providing an indicia for selecting the receiver side relay node;

step of making judgment whether the up-link receiver side relay node indicates own node or not upon detection of arrival of the route setting packet;

step of recording a node indicated by the sender node identification information contained in the route setting packet in a relay node list when judgment is made that the up-link receiver side information indicates own node;

step of taking a measured path loss upon judgment that the up-link receiver side node relay node information does not indicative own node, as path loss Ln (n is unique number of a sender node of the route setting packet) between the node transmitting the route setting packet and the own node;

step of reading the metric Mr.n contained in the route setting packet;

step of calculating and storing an update metric from the path loss Ln and the metric Mr.n;

step of making judgment whether the sender node identification information contained in the currently received route setting packet matches with the current up-link receiver side relay node information or not;

step of forgetting all stored update metrics when the sender node identification information contained in the currently received route setting packet matches with the current up-link receiver side relay node information;

step of comparing the update metric corresponding to the route setting packet received in the past and the currently obtained update metric Mn when the sender node identification information contained in the currently received route setting packet does not match with the current up-link receiver side relay node information;

step of setting the update metric Mn to a metric contained in the metric of the route setting packet and registering the node indicated by the sender node identification information of the currently arrived route setting packet as the up-link receiver side relay node when all of the update metrics are forgotten or when the update metric Mn is judged as minimum; and step of transmitting a route setting packet containing the transmission metric M as the metric, sender node identification information indicating identification information of own node and the up-link receiver side relay node information.

According to the eighteenth aspect of the present invention, a relaying method for a radio network including a core node connected to a wired network, relay nodes each relaying at least one of a down-link data packet transmitted from the core node and an up-link data packet directed toward the core node, and a terminal station capable of transmission and reception of data packet with both of the core node and the relay node, comprises:

step of detecting arrival of a route setting packet including a sender node identification information, an up-link receiver side relay node information and a metric indicative of an amount providing an indicia for selecting the receiver side relay node;

step of making judgment whether the up-link receiver side relay node indicates own node or not upon detection of arrival of the route setting packet;

step of recording a node indicated by the sender node identification information contained in the route setting packet in a relay node list when judgment is made that the up-link receiver side information indicates own node;

step of taking a measured path loss upon judgment that the up-link receiver side node relay node information does not indicative own node, as path loss Ln (n is unique number of a sender node of the route setting packet) between the node transmitting the route setting packet and the own node;

step of reading the metric Mr.n contained in the route setting packet;

step of calculating and storing an update metric from the path loss Ln and the metric Mr.n;

step of comparing the update metric Mn with the update metric corresponding to the route setting packet received in the past for determining a sender node m (m is unique number of node) having minimum metric;

step of making judgment whether the sender node m is the same as the current up-link receiver side relay node and n m;

step of setting the update metric Mn to a metric contained in the metric of the route setting packet and registering the node indicated by the sender node m as the up-link receiver side relay node when the sender node m is not the same as the current up-link receiver side relay node or n=m; and step of transmitting a route setting packet containing the transmission metric M as the metric, sender node identification information indicating identification information of own node and the up-link receiver side relay node information.

According to the nineteenth aspect of the present invention, a program of a relaying method for a radio network including a core node connected to a wired network, relay nodes each relaying at least one of a down-link data packet transmitted from the core node and an up-link data packet directed toward the core node, and a terminal station capable of transmission and reception of data packet with both of the core node and the relay node, the program being executed by a computer for implements the step of:

selecting the relay node having total path loss to be minimum at least one of between relay nodes includes in a relay route of the data packet and between the relay node and the core node.

According to the twentieth aspect of the present invention program of a relaying method for a radio network including a core node connected to a wired network, relay nodes each relaying at least one of a down-link data packet transmitted from the core node and an up-link data packet directed toward the core node, and a terminal station capable of transmission and reception of data packet with both of the core node and the relay node, the program being executed by a computer for implements the step of:

relaying the up-link data packet to other one of up-link relay node and the core node when the up-link data packet addressed to own node is received and relaying a down-link data packet to at least one down-link relay node when the down-link data packet address to the own node is received.

According to the twenty-first aspect of the present invention, a program of a relaying method for a radio network including a core node connected to a wired network, relay nodes each relaying at least one of a down-link data packet transmitted from the core node and an up-link data packet directed toward the core node, and a terminal station capable of transmission and reception of data packet with both of the core node and the relay node, the program being executed by a computer for implements the step of:

step of detecting arrival of a route setting packet including a sender node identification information, an up-link receiver side relay node information and a metric indicative of an amount providing an indicia for selecting the receiver side relay node;

step of making judgment whether the up-link receiver side relay node indicates own node or not upon detection of arrival of the route setting packet;

step of recording a node indicated by the sender node identification information contained in the route setting packet in a relay node list when judgment is made that the up-link receiver side information indicates own node;

step of taking a measured path loss upon judgment that the up-link receiver side node relay node information does not indicative own node, as path loss Ln (n is unique number of a sender node of the route setting packet) between the node transmitting the route setting packet and the own node;

step of reading the metric Mr.n contained in the route setting packet;

step of calculating and storing an update metric from the path loss Ln and the metric Mr.n;

step of comparing the update metric Mn with the update metric corresponding to the route setting packet received in the past for making judgment whether the update metric Mn is minimum;

step of setting the update metric Mn to a metric contained in the metric of the route setting packet and registering the node indicated by the sender node identification information of the currently arrived route setting packet as the up-link receiver side relay node when the update metric Mn is judged as minimum; and step of transmitting a route setting packet containing the transmission metric M as the metric, sender node identification information indicating identification information of own node and the up-link receiver side relay node information.

According to the twenty-second aspect of the present invention, a program of a relaying method for a radio network including a core node connected to a wired network, relay nodes each relaying at least one of a down-link data packet transmitted from the core node and an up-link data packet directed toward the core node, and a terminal station capable of transmission and reception of data packet with both of the core node and the relay node, the program being executed by a computer for implements the step of:

step of detecting arrival of a route setting packet including a sender node identification information, an up-link receiver side relay node information and a metric indicative of an amount providing an indicia for selecting the receiver side relay node;

step of making judgment whether the up-link receiver side relay node indicates own node or not upon detection of arrival of the route setting packet;

step of recording a node indicated by the sender node identification information contained in the route setting packet in a relay node list when judgment is made that the up-link receiver side information indicates own node;

step of taking a measured path loss upon judgment that the up-link receiver side node relay node information does not indicative own node, as path loss Ln (n is unique number of a sender node of the route setting packet) between the node transmitting the route setting packet and the own node;

step of reading the metric Mr.n contained in the route setting packet;

step of calculating and storing an update metric from the path loss Ln and the metric Mr.n;

step of making judgment whether the sender node identification information contained in the currently received route setting packet matches with the current up-link receiver side relay node information or not;

step of forgetting all stored update metrics when the sender node identification information contained in the currently received route setting packet matches with the current up-link receiver side relay node information;

step of comparing the update metric corresponding to the route setting packet received in the past and the currently obtained update metric Mn when the sender node identification information contained in the currently received route setting packet does not match with the current up-link receiver side relay node information;

step of setting the update metric Mn to a metric contained in the metric of the route setting packet and registering the node indicated by the sender node identification information of the currently arrived route setting packet as the up-link receiver side relay node when all of the update metrics are forgotten or when the update metric Mn is judged as minimum; and step of transmitting a route setting packet containing the transmission metric M as the metric, sender node identification information indicating identification information of own node and the up-link receiver side relay node information.

According to the twenty-third aspect of the present invention, a program of a relaying method for a radio network including a core node connected to a wired network, relay nodes each relaying at least one of a down-link data packet transmitted from the core node and an up-link data packet directed toward the core node, and a terminal station capable of transmission and reception of data packet with both of the core node and the relay node, the program being executed by a computer for implements the step of:

step of detecting arrival of a route setting packet including a sender node identification information, an up-link receiver side relay node information and a metric indicative of an amount providing an indicia for selecting the receiver side relay node;

step of making judgment whether the up-link receiver side relay node indicates own node or not upon detection of arrival of the route setting packet;

step of recording a node indicated by the sender node identification information contained in the route setting packet in a relay node list when judgment is made that the up-link receiver side information indicates own node;

step of taking a measured path loss upon judgment that the up-link receiver side node relay node information does not indicative own node, as path loss Ln (n is unique number of a sender node of the route setting packet) between the node transmitting the route setting packet and the own node;

step of reading the metric Mr.n contained in the route setting packet;

step of calculating and storing an update metric from the path loss Ln and the metric Mr.n;

step of comparing the update metric Mn with the update metric corresponding to the route setting packet received in the past for determining a sender node m (m is unique number of node) having minimum metric;

step of making judgment whether the sender node m is the same as the current up-link receiver side relay node and n m;

step of setting the update metric Mn to a metric contained in the metric of the route setting packet and registering the node indicated by the sender node m as the up-link receiver side relay node when the sender node m is not the same as the current up-link receiver side relay node or n=m; and step of transmitting a route setting packet containing the transmission metric M as the metric, sender node identification information indicating identification information of own node and the up-link receiver side relay node information.

Namely, the radio network according to the present invention determines the core node among node groups deployed in certain area, connects the core node with the backbone network, and connects the core node with wireless. The nodes other than the core node relays up-link data to the core node or relays the down-link data transmitted from the core node.

By this, upon connecting the node groups with the backbone network, only the core node and the backbone network are connected by wire line to permit reduction of installation cost of the wire line. Also, since connection of the node groups is established by radio, service area can be easily expanded.

The core node broadcasts the relay route setting packet. The relay node measures the path loss between the node transmitted the packet and the own node by reception of the relay route setting packet. At the same time, with making reference to the metric contained in the packet, the receiver side relay station is selected so that the path loss becomes minimum by a sum of the measured path loss and the metric. Here, the metric represents a total path loss from the core node to the node transmitted the relay route setting packet.

Each base station autonomously performs the foregoing operation. Therefore, receiver side in relay to have the minimum path loss can be selected over the relay route and can establish the relay route resistive against interference which can be a significant problem in the cellular system.

Also, by using the path loss as metric, a stable relay route that is not dependent upon interference power and which is variable depending upon traffic, can be reliably established. On the other hand, even when the frequency band is different, difference of the path loss is considered to be small, in general. Therefore, even when different frequency bands are used in up- and down-links, an appropriate relay route can be obtained.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only.

In the drawings:

FIG. 7 is an illustration showing a relay node list;

FIG. 8 is an illustration showing a data structure of a down-link data packet;

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. Well-known structures are not shown in detail in order to avoid unnecessary obscurity of the present invention.

Figure 1:
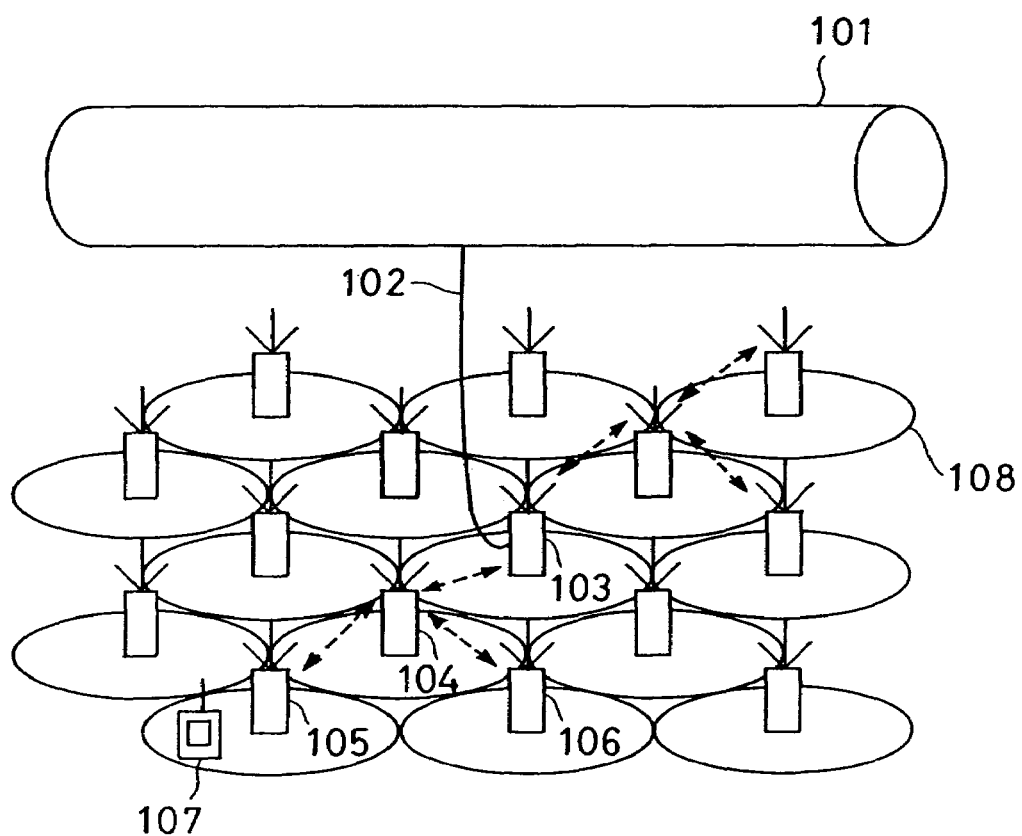
FIG. 1 is a diagrammatic illustration of one embodiment of a cellular system according to the present invention.

FIG. 1 is a diagrammatic illustration showing one embodiment of a cellular system according to the present invention. In FIG. 1, the reference numeral 107 denotes a terminal station, and reference numeral 108 denotes a cell. A core node 103 and a wired backbone 101 are connected by wire circuit 102. Relay nodes 104 to 106 are connected to the core node 103 by radio relay.

Each of the relay nodes and the core node may be provided with directional antenna. In such case, the directional antenna may be set in a fixed direction, or, alternatively, may be set in a plurality of directions adaptively. By installing a directional antenna, interference given to neighboring nodes and the terminal stations can be suppressed, thereby realizing high system capacity in the overall system.

Other relay nodes shown in FIG. 1 are also connected to the core node 103 through a radio relay circuit, similar to the relay nodes 104 to 106. Setting of a relay route of the radio relay circuit is initiated by a route setting packet broadcasted from the core node 103. Namely, the relay node receiving the route setting packet broadcasted by the core node 103 newly broadcast a route setting packet to other nodes. In response to the broadcasted route setting packet sent by the relay node, other relay nodes also broadcast the route setting packet. This operation is repeated. Detail of transmission of the route setting packet is discussed below.

Figure 2:
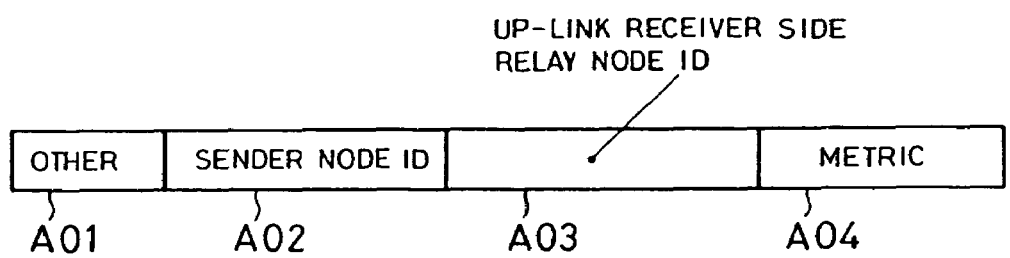
FIG. 2 is an illustration showing one example of a structure of a route setting packet.

FIG. 2 is an illustration showing one example of a structure of the route setting packet. In FIG. 2, the route setting packet comprises fields for transmitting respective of a sender node ID (identification information) A02, an up-link receiver side relay node ID A03, a metric A04 and others A01. It should be noted that the arrangement of the respective elements can be different from the example shown in FIG. 2.

The sender node ID A02 indicates an ID number of the node transmitting the route setting packet. The up-link receiver side relay node ID A03 indicates the ID number of an up-link receiver side relay node set by the node broadcasting the route setting packet. In another A01, a control signal, such as a pilot signal or the like, a data signal such as system information and so forth that is necessary for demodulation of the packet are included. The metric A04 indicates the amount of information required for each node to select an up-link receiver side relay node.

Figure 3:
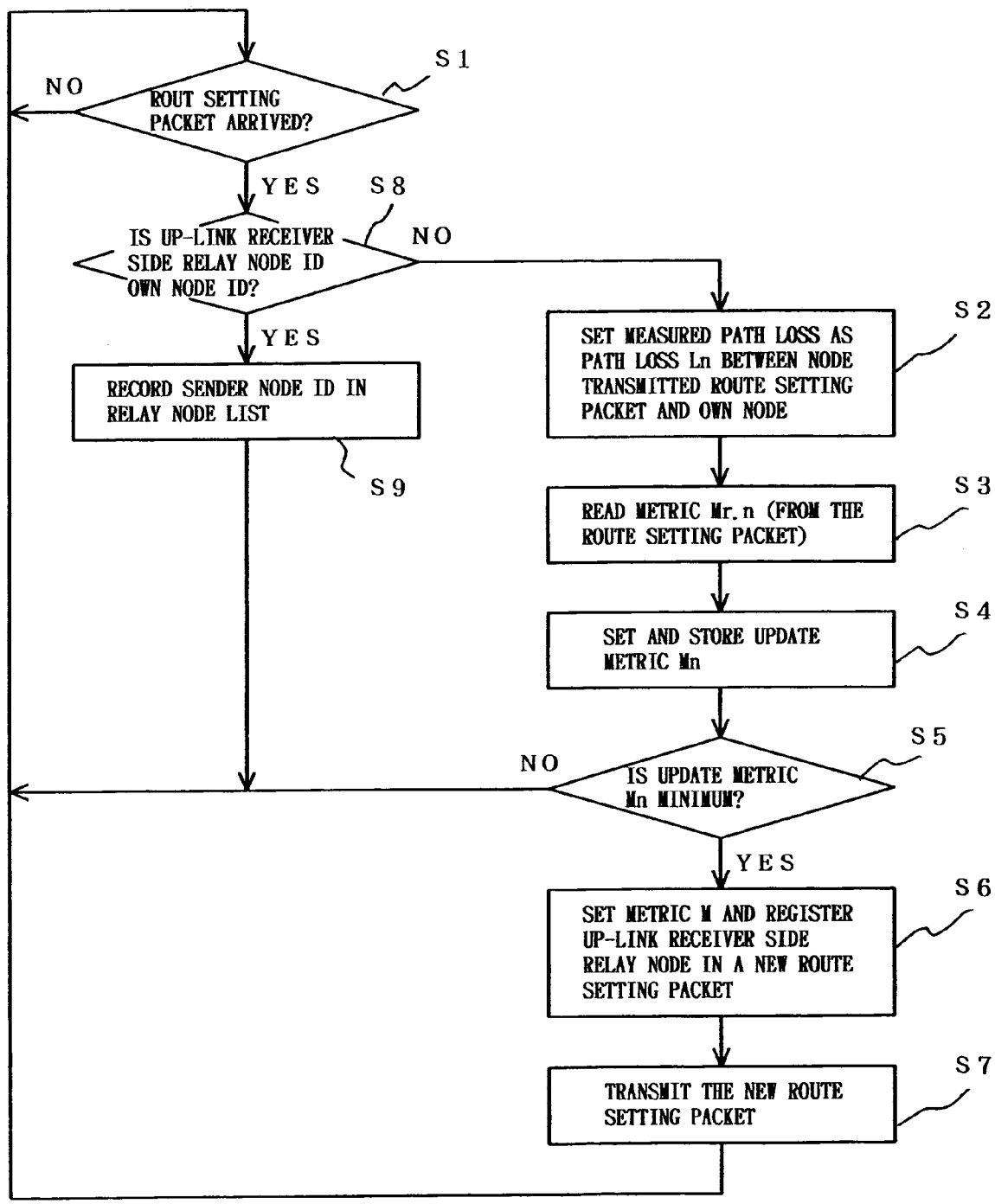
FIG. 3 is a flowchart showing one example of a relay route setting process to be executed in each relay node in one embodiment of the present invention.
Figure 4:
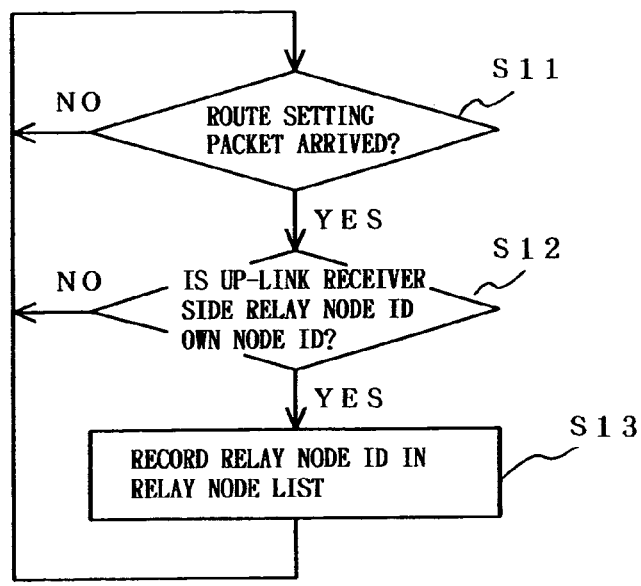
FIG. 4 is a flowchart showing one example of the relay route setting process to be executed in a core node in one embodiment of the present invention.

FIG. 3 is a flowchart showing one example of a relay route setting process executed in each relay node in one embodiment of the present invention, and FIG. 4 is a flowchart showing one example of the relay route setting process to be executed in a core node in one embodiment of the present invention. The updating method of the metric A04 the up-link receiver side node selecting procedure and route setting process in the code node 103, depending upon the metric amount, will be discussed with reference to FIGS. 1 to 4.

At first, transmission of the route setting packet is performed by the core node 103. The relay route setting packet broadcasted from the core node 103 is received by unspecified relay nodes 104 to 106. Namely, transmission of the route setting packet is performed by broadcasting. At this time, since no up-link receiver side relay node of the core node 103 is identified, the content of the up-link receiver side node ID A03 may be any arbitrary ID.

The metric contained in the route setting packet broadcasted from the code node 103 is set to zero. A broadcasting interval of the route setting packet may be set for regular broadcasting, or, in the alternative, for broadcasting at a random interval or in response to a command from a server (not shown) on the wired backbone network 101.

The relay nodes 104 to 106 check whether the route setting packet arrived or not (step S1 of FIG. 3). If the route setting packet did not arrive, the process is returned to step S1. For detection of arrival of the route setting packet in the relay nodes 104 to 106, a carrier sense or the like is used. When arrival of the route setting packet is detected, the relay nodes 104 to 106 make reference to the up-link receiver side relay node ID contained in the route setting packet for checking whether the up-link receiver side relay node ID matches with the own node ID or not (step S8 of FIG. 3).

When the receiver side relay node ID matches with the own node ID, the relay nodes 104 to 106 record the ID of the node broadcasting the route setting packet, namely the sender node ID contained in the route setting packet in the relay node list (step S9 of FIG. 3).

The relay node list is a table indicating the down-link receiver side node ID number and is constructed as shown in FIG. 7. The relay node list functions as a receiver side node list upon the down-link data packet relaying which is discussed below. Each receiver side relay node ID contained in the relay node list can be forgotten (erased) after a given period of time. For instance, when a new relay node is added in the cell, when an existing node is moved or when a new building is constructed in the cell, re-establishment of the relay route becomes necessary. In order to adapt to a re-established relay route, each receiver side relay node ID contained in the relay node list may be intentionally forgotten after expiration of the given time period.

If a judgment is made that the relay node ID does not match with the own node ID, the relay nodes 104 to 106 take a path loss that is measured at the timing of judgment, as a path loss Ln (n is specific number of the sender node of the route setting packet) between the node that broadcasted the route setting packet and the own node (step S2 of FIG. 3). Measurement of the path loss is generally performed upon reception of the packet, irrespective of the content. For a measurement of the path loss, reception power of the packet or the like may be used. In order to facilitate measurement of the path loss, transmission power of the route setting packet can be fixed. It should be noted that n represents a node number and the node number n is designated by the sender node ID contained in the route setting packet.

The relay nodes 104 to 106 read the metric Mr, n contained in the received route setting packet (step S3 of FIG. 3). Here, the metric Mr, n represents a total of path loss in the set route. Here, the set route means a route from the sender node of the received route setting packet to the core node.

The relay nodes 104 to 106 set an update metric Mn from the transmission loss Ln measured at step S2 and the metric Mr, n. Here, the update metric Mn is given as a sum of the path loss Ln and the metric Mr, n. The relay nodes 104 to 106 store the update metric Mn calculated through the foregoing process (step S4 of FIG. 3). It should be noted that, among stored update metric, the update metric maintained for a period of time in excess of a given time period can be forgotten (erased). For instance, when a new relay node is added in the cell, or when a new building is constructed in the cell, re-establishment of the relay route becomes necessary. In order to do this, stored update metrics may be intentionally forgotten after expiration of the given time period.

On the other hand, stored metric is made most recent constantly. Namely, when the update metric for the node n as sender of the route setting packet was stored in the past, the past metric is re-written by the new update metric derived at step S4.

The relay nodes 104 to 106 compare the update metric Mn and the update metric corresponding to the route setting packet received in the past. If the newly obtained update metric Mn is not minimum (step S5 of FIG. 3), the process is returned to step S1 and route setting packet is not transmitted.

When the currently obtained update metric Mn is at a minimum (step S5 of FIG. 3), the relay nodes 104 to 106 set the metric to be contained in the metric A04 to the update metric Mn, and the node indicated by the sender node ID of the currently arrived route setting packet is registered as the up-link receiver side relay node (step S6 of FIG. 3). Thus, the up-link receiver side relay node is only one in each node.

The relay nodes 104 to 106 set the metric M as set forth above as metric and transmit the route setting packet including the necessary information respective of other items shown in FIG. 2 (step S7 of FIG. 3).

Upon reception of the route setting packet, the relay nodes 104 to 106 may return an acknowledgement signal for accuracy. Since the route setting packet is the control packet directed to an unspecified node, the relay nodes 104 to 106 may receive the reception response signals from a plurality of nodes after transmission of the route setting packet. When the relay nodes 104 to 106 do not receive any returned reception response signal, re-transmission of the route setting packet is performed.

On the other hand, the relay route setting process to be executed in a core node is different from that disclosed for relay nodes. Initially, the core node 103 checks whether the route setting packet has arrived or not (step S11 of FIG. 4). If the route setting packet has not arrived, the process is returned to step S11. Even in the core node 103, carrier sense or the like is used for detection of arrival of the route setting packet. When the core node 103 detects arrival of the route setting packet, the up-link receiver side relay node ID contained in the route setting packet is referenced to check whether the up-link receiver side node ID matches with the own node ID (step S12 of FIG. 4).

When the up-link receiver side node ID matches with the own node ID, the core node 103 records the node indicated in the ID of the route setting packet transmitted by the other node, namely the sender node ID contained in the route setting packet, identified in the relay node list (step S13 of FIG. 4). The relay node list has the same functionality as that contained in the relay nodes 104 to 106. Namely, the relay node list comprises a table indicating the number ID of the down-link receiver side relay node. The respective receiver side relay node contained in the relay node list can be forgotten (erased) after expiration of a given time period.

Figure 5:
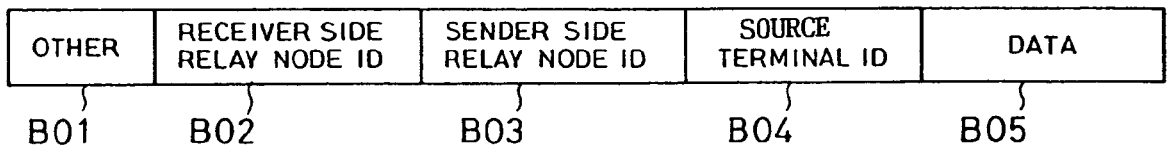
FIG. 5 is an illustration showing one example of a structure of an up-link data packet.

Next, relay transmission of the data packet will be discussed. FIG. 5 is an illustration showing one example of the structure of the up-link data packet. In FIG. 5, the up-link receiver side data packet comprises fields respectively transmitting a receiver side relay node ID B02, a sender side relay node ID B03, a source terminal ID B04, a data B05 and other B01.

In the sender side relay node ID B03, the ID of the relay node that transmitted the up-link data packet or is going to transmit the up-link data packet is set. When the terminal transmits a new up-link data packet, special information indicative of a condition of the new up-link data packet other than the node ID contained in the sender side relay node ID, is transmitted.

In the field, other B01, control information, such as a pilot signal for decoding, identification signal identifying up and down-links, ID number of the data packet and so forth is contained. It should be noted that the order of the structural elements shown in FIG. 5 should not be necessarily specific but can be different in any order.

Figure 6:
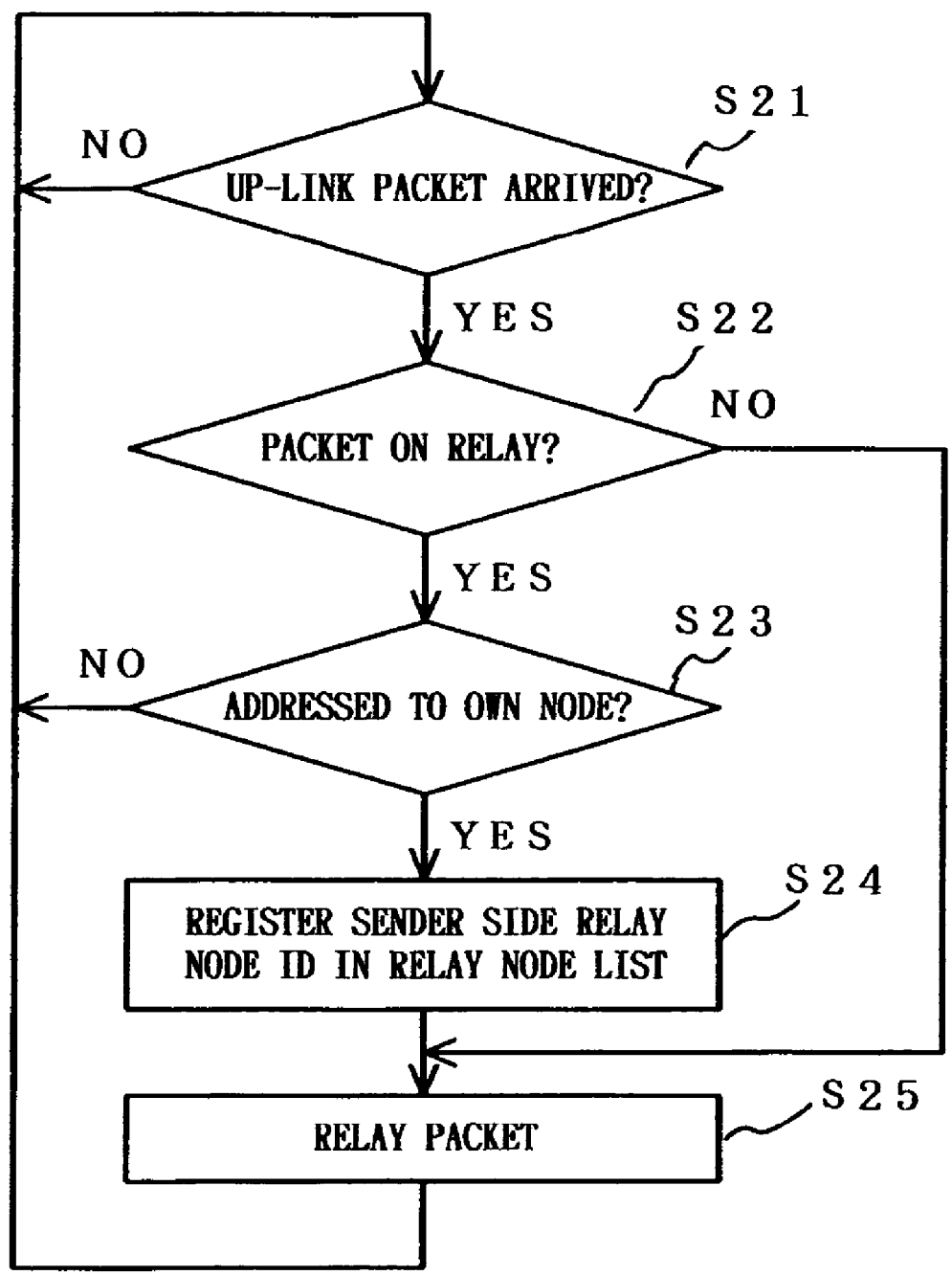
FIG. 6 is a flowchart showing one example of a transmission process of data packet in up-link.

FIG. 6 is a flowchart showing one example of a transmission process of data packet in up-link. Relay transmission method of the data packet in up-links and down-links in one embodiment of the present invention will be discussed with reference to FIGS. 5 and 6. In an embodiment of the present invention, an example of the relay transmission method of the up-link to be executed in each base station is now discussed.

The up-link data packet is transmitted to the code node 103 via the relay nodes 104 to 106. The relay nodes 104 to 106 detect arrival of the up-link data packet (step S21 of FIG. 6). Here, for detection of the data packet, carrier sense or the like is used. Judgment whether the data packet of interest is up-link one or down-link is performed, depending upon the control information contained in the up-link data packet as shown in FIG. 5.

When a plurality of nodes relay the data packet from the same terminal, it is possible that data packets of the same content are received from a plurality of sender nodes by one node. In such case, demodulating may be performed by selecting only the up-link data packet having the highest reception quality, or by combining the received signals by a diversity reception technique.

If arrival of the up-link data packet is not detected, the relay nodes 104 to 106 execute step S11 again. On the other hand, when arrival of the up-link data packet is detected, the relay nodes 104 to 106 check whether the arrived up-link data packet is the data pack on relay or the data packet newly transmitted from a terminal 107 (step S22 of FIG. 6).

Here, upon making a judgment whether the packet is the data packet on relay, the nodes 104 to 106 check the sender side node ID B03 contained in the up-link data packet. For instance, if the sender side relay node ID B03 indicates the ID of the own node, it is judged that the packet is a new up-link data packet.

Here, upon making a judgment whether the packet is the data packet on relay, the relay nodes 104 to 106 check the sender side node ID B03 contained in the up-link data packet. For instance, if the sender side relay node ID B03 is the ID of the own node, it is judged that the packet is a new up-link data packet.

Here, upon making a judgment of the data packet on relay (other than new up-link data packet), the relay nodes 104 to 106 check the receiver side relay node ID B02 contained in the data packet. If the receiver side relay node ID B02 that is checked is not the ID of the own node (step S23 of FIG. 6), the process returns to step S21.

If the receiver side relay node ID B02 that is checked is the own node ID (step S23 of FIG. 6), the relay node 104 to 106 record the sender side relay node ID B03 in the relay node list (step S24 of FIG. 6). One example of the relay node list is shown in FIG. 7.

The relay node list is used as the receiver side node list upon down-link data packet relaying and is discussed below. Each receiver side relay node ID B02 contained in the relay node list can be forgotten after expiration of the given time period. In the node does not receive the up-link data packet from the relay node, the relay node list becomes empty.

After recording the sender side relay node ID B03, the relay nodes 104 to 106 relay the data packet to the up-link receiver side relay node set in the relay route setting process set forth above (step S25 of FIG. 6). After relaying, the process returns to step S21.

Upon transmission of the up-link data packet, transmission power of the data packet can be controlled so that the data packet may be received in the relay node or the receiver side relay node with a given reception power or a given reception quality.

On the other hand, when a judgment is made that the arrived up-link data packet is not on relaying but is newly generated from the terminal station 107 (step S22 of FIG. 6), the relay nodes 104 to 106 relay the data packet toward the receiver side relay node (step S25 of FIG. 6). It should be noted that recording operation to the relay node list upon the up-link data packet shown in FIG. 6 is also performed upon the relay route setting packet transmission as set forth above. In order to reduce the process load, the recording operation may not be implemented upon the up-link data packet transmission.

The relaying of the up-link data packet in the core node is substantially the same as that in the relay node shown in FIG. 6, except for step S25. In the core node, instead of relaying the up-link data packet to the receiver side relay node, the up-link data packet is transmitted to the wired backbone network.

FIG. 8 is an illustration showing a data structure of the down-link data packet. In FIG. 8, the data packet comprises fields respectively transmitting a receiver side relay node ID C02, a sender side relay node ID C03, a destination terminal ID C04, a data C05 and other C01.

In the field for the sender side relay node ID C03, the ID of the core node 103 transmitting the down-link data packet or the relay nodes 104 to 106 is set. When a plurality of receiver side relay nodes are present, a plurality of receiver side relay nodes ID C02 are also provided. On the other hand, the receiver side nodes ID C02 can set not only the individual node ID, but also the dedicated ID indicative of all nodes included in the relay node list. In the field for other C01, control information, such as pilot signal for demoudulating, the identification signal of up- and down-link and packet ID number and so forth can be contained. It should be noted that the order of the structural element, shown in FIG. 8, should not be specific but can be different.

Figure 9:
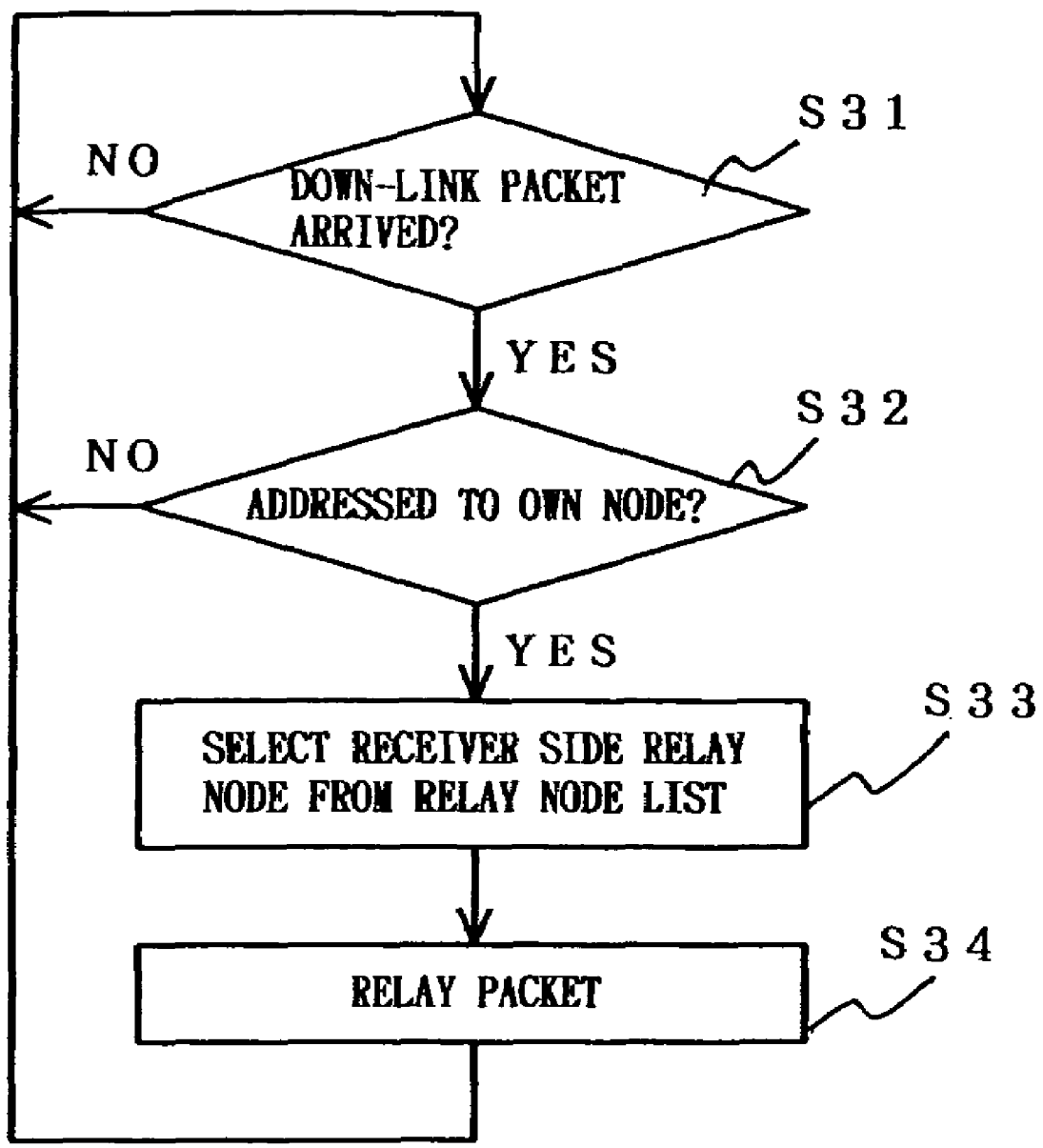
FIG. 9 is a flowchart showing one example of a down-link relay transmission process in one embodiment of the present invention.

FIG. 9 is a flowchart showing one example of a down-link relay transmission process in one embodiment of the present invention. Discussion will be given for one example of the down-link data packet relaying process in one embodiment of the present invention with reference to FIGS. 8 and 9. It should be noted that the process shown in FIG. 9 is implemented in each relay nodes 104 to 106.

The relay nodes 104 to 106 monitor the arrival of the down-link data packet. If no new down-link data packet arrives (step S31 of FIG. 9), the process is returned to step S31. Detection of arrival of the down-link data packet is implemented by carrier sense or the like.

When the down-link data packet arrives (step S31 of FIG. 9), the receiver side relay node contained in the down-link data packet is read. If the receiver side node ID does not match with the own node ID (step S32 of FIG. 9), the process returns to step S31 and the relaying of the reception data packet is not performed.

If the receiver side relay node ID matches with the own node ID (step S32 of FIG. 9), the relay nodes 104 to 106 make reference to the relay node list that is produced upon relaying of the up-link data packet or the relaying of the route setting packet. Some of the nodes contained in the relay node list are set as the receiver side relay node for the data packet (step S33 of FIG. 9).

Upon setting all nodes, particular identification number dedicated therefor is set as the sender ID C04. The relay nodes 104 to 106 relays the data packet after the receiver side relay node is set (step S34 of FIG. 9).

Upon transmission of the down-link data packet, transmission power of the data packet can be controlled so that the data packet may be received in the relay node or the receiver side relay node with a given reception power or a given reception quality.

Relaying of the down-link data packet in the core node can be the same as the method in the relay node shown in FIG. 9.

One example of receiving operation of the terminal station 10 in one embodiment of the present invention will be discussed with reference to the flow chart shown in FIG. 10.

Figure 10:
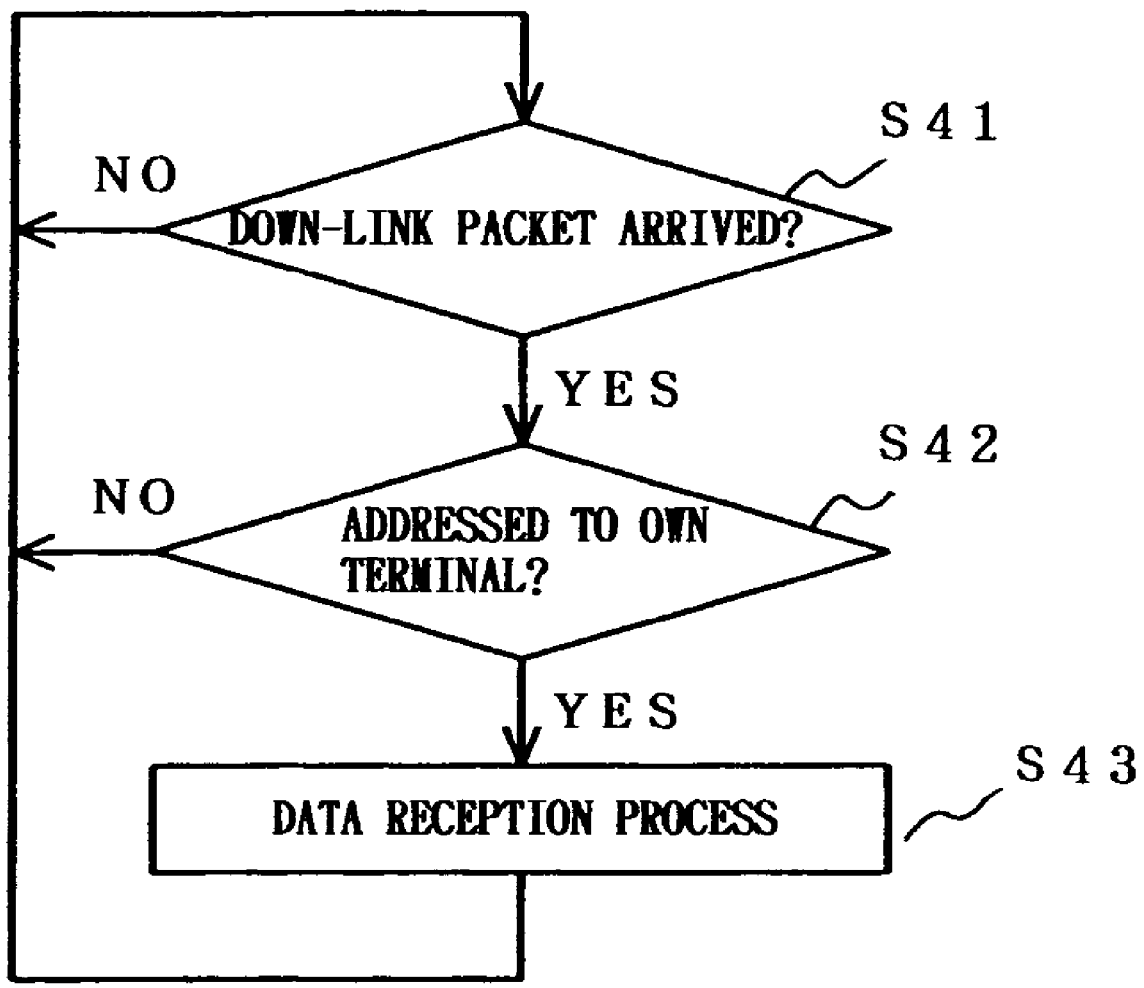
FIG. 10 is a flowchart showing one example of a receiving operation of a terminal station in one embodiment of the present invention.

The terminal station 107 detects arrival of the down-link data packet by carrier sense or the like, and the process returns to step S41, if arrival of the data packet is not detected (step S41 of FIG. 10). When arrival of the data packet is detected (step S41 of FIG. 10), the destination terminal ID contained in the down-link data packet shown in FIG. 8 is read out. If the destination terminal ID does not match with the own terminal ID (step S42 of FIG. 10), the process returns to step S41.

If the destination terminal ID matches with the own terminal ID (step S42 of FIG. 10), the terminal station 107 performs a reception process of the data contained in the data packet (step S43 of FIG. 10). Then, process returns to step S41.

Figure 11:
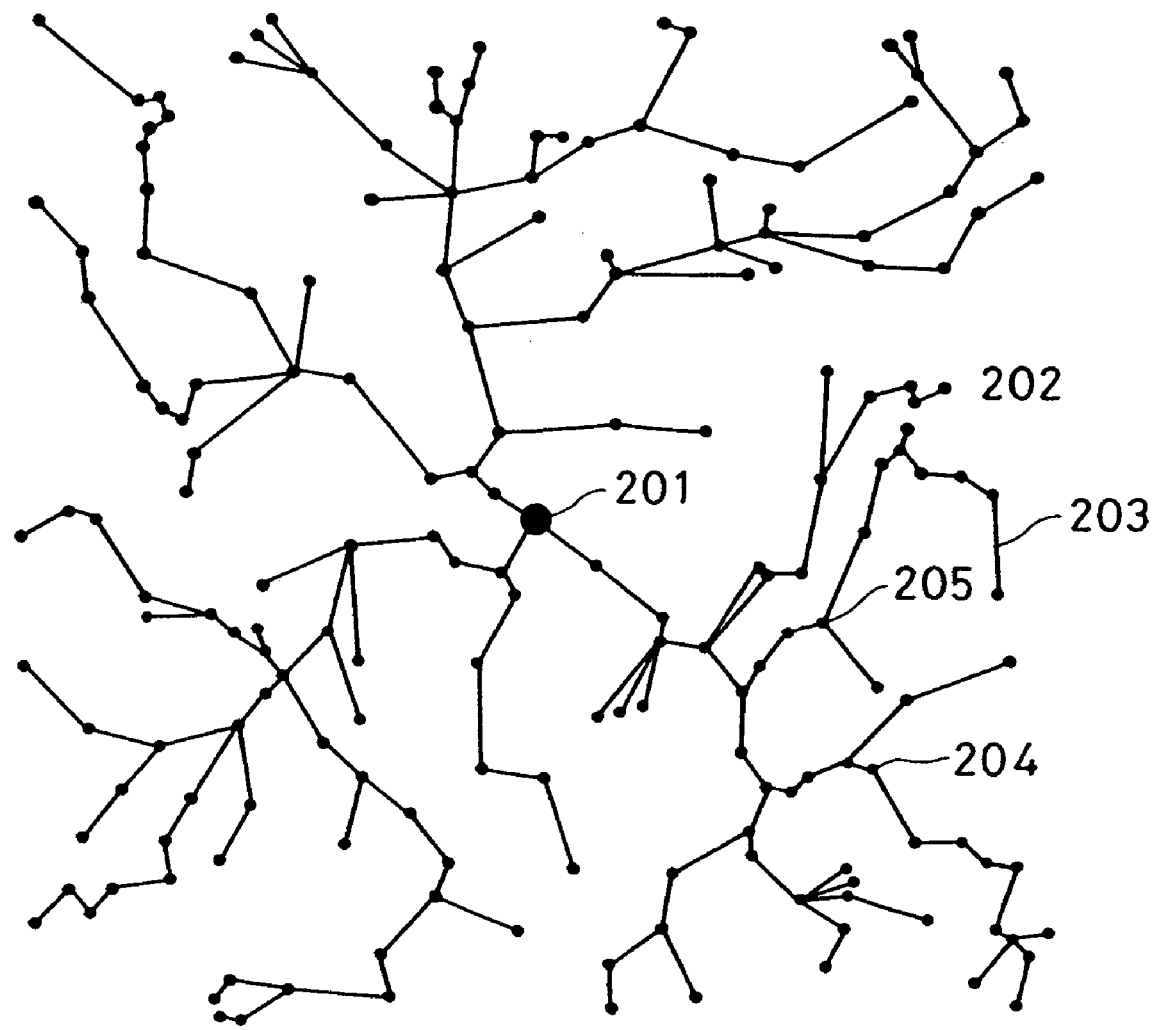
FIG. 11 is an illustration showing one example of a relay route in the case where one embodiment of the relay route setting method according to the present invention is employed.
Figure 12:
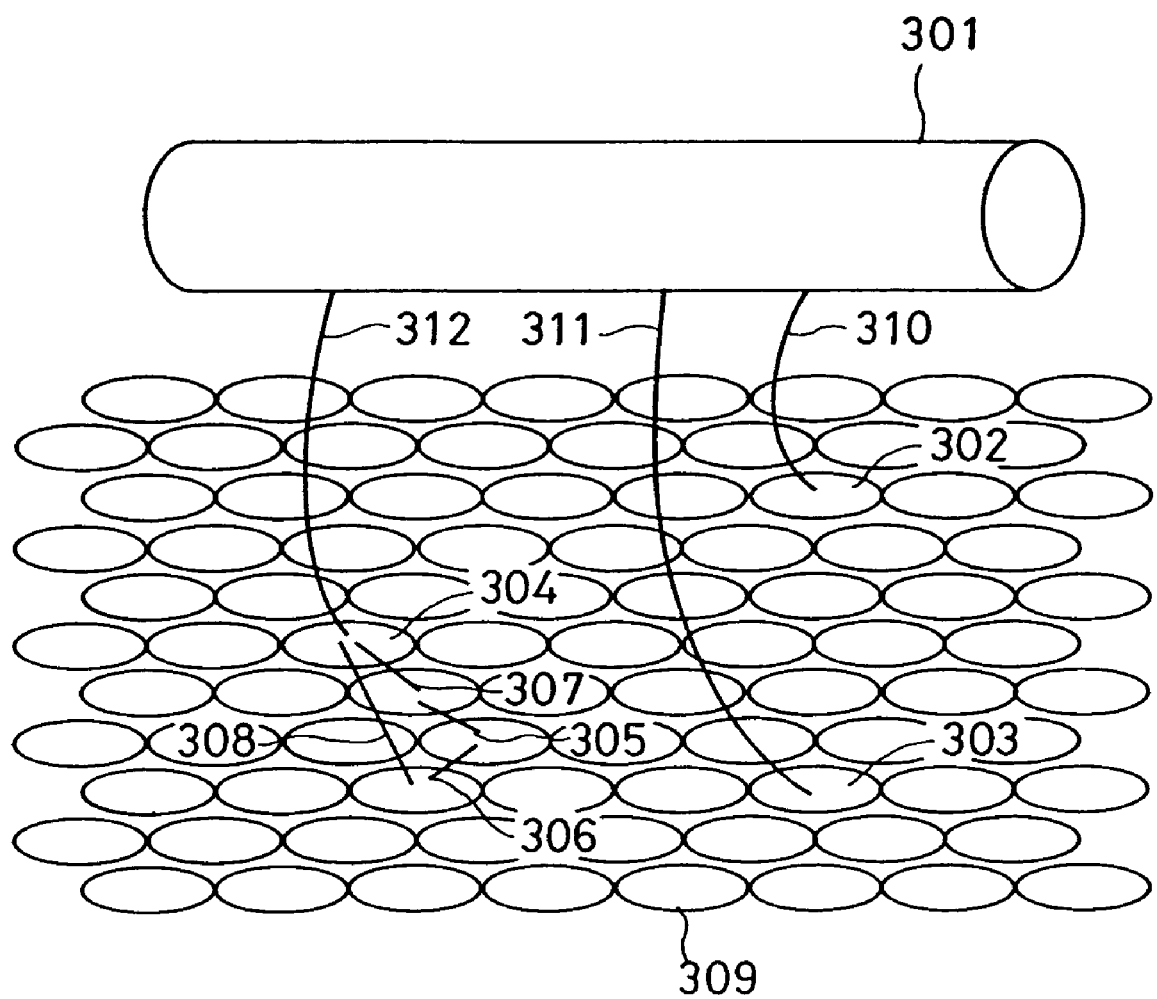
FIG. 12 is an illustration for comparing one embodiment of the relay route setting method according to the invention and a minimum hop number relay route setting method.

FIGS. 11 and 12 are illustrations showing one example of the relay route set by the relay route setting in one embodiment of the present invention. FIG. 11 is an illustration showing one example of a relay route in the case where one embodiment of the relay route setting method according to the present invention is employed. In FIG. 11, a large dot 201 represents the core node, small dots 202, 204, 205 represent relay nodes, and 203 denotes relay routes. At the relay node 202, no down-link receiver side relay node is present, indicating that the relay node list is empty in the relay node.

FIG. 12 is an illustration for comparing one embodiment of the relay route setting method according to the invention and a minimum hop routing method. In FIG. 12, 301 denotes a wired backbone network, 302, 303 and 304 are cells covered by the core nodes, 309 and elliptic areas not identified by reference numeral are nodes covered by nodes other than the core nodes. The reference numerals 310, 311, 312 are wire lines connecting the core nodes and the wired backbone network 301.

One example of the relay route obtained by the relay route setting method in one embodiment of the present invention is shown as radio relay circuits 307, 305 and 306. On the other hand, for comparison, minimum hop routing, number relaying with minimum number of relay nodes provides the radio relay route shown by reference numeral 308, for example.

By using the relay route setting method of one embodiment of the present invention, selecting the route to have the minimum path loss in the overall relay route can be realized. Then, a relay route without significant interference can be realize.

On the other hand, in the case of the minimum hop route, shown in FIG. 12, the number of relay stations becomes smaller in comparison with the route setting method in one embodiment of the present invention. However, considering the overall relay route, a total path loss becomes greater than that in one embodiment of the present invention. Therefore, reliability of the overall radio relay route becomes low. In the relaying method in one embodiment of the present invention, the radio relaying route having high reliability can be reliably established, which renders higher throughput in comparison with the minimum hop route method.

In the down-link, using a relationship between the sender side relay node and the receiver side relay node formed upon up-link packet relay, the node serving as the sender side relay node in up-link is selected as the receiver side relay node.

By using the path loss as the metric, a stable relay route that is independent of interference power, which is variable depending upon amount of traffic, can be reliably established. On the other hand, since difference of path loss for different frequency bands is generally considered to be small, an appropriate relay route can be established, if different frequency bands are used in the up-link and down-link.

Only the core node is connected to the backbone network by wire. Connections between another node and the backbone network through the core node is automatically established by radio, thereby reducing the installation cost of the wire line. Also, since the node groups are connected by radio, the service areas can be easily expanded. Furthermore, since each node is not constrained by wire, re-arrangement of a node location can be done easily.

When the terminal moves between the nodes belonging the same core node, it becomes unnecessary to access the mobile control station or the like in the wired backbone network, and thus high speed hand-over becomes possible.

As demonstrated in the example shown in FIG. 11, when the up-link data packet transmitted by the terminal is received by a plurality of nodes, the same up-link data packet is relayed through a plurality of relay routes. As can be appreciated from the example shown in FIG. 11, by relaying the up-link data packet, the relay routes are inherently coupled together on the way of relaying at a certain node, and a diversity effect can be obtained by either selecting one node having good quality upon receiving the data packet, or by combining the same up-link data packet in the node where the relay routes are coupled.

In the cellular system in accordance with one embodiment of the present invention, a terminated node of the up-link and a start node of the down-link of the relay node are both core nodes.

Figure 13:
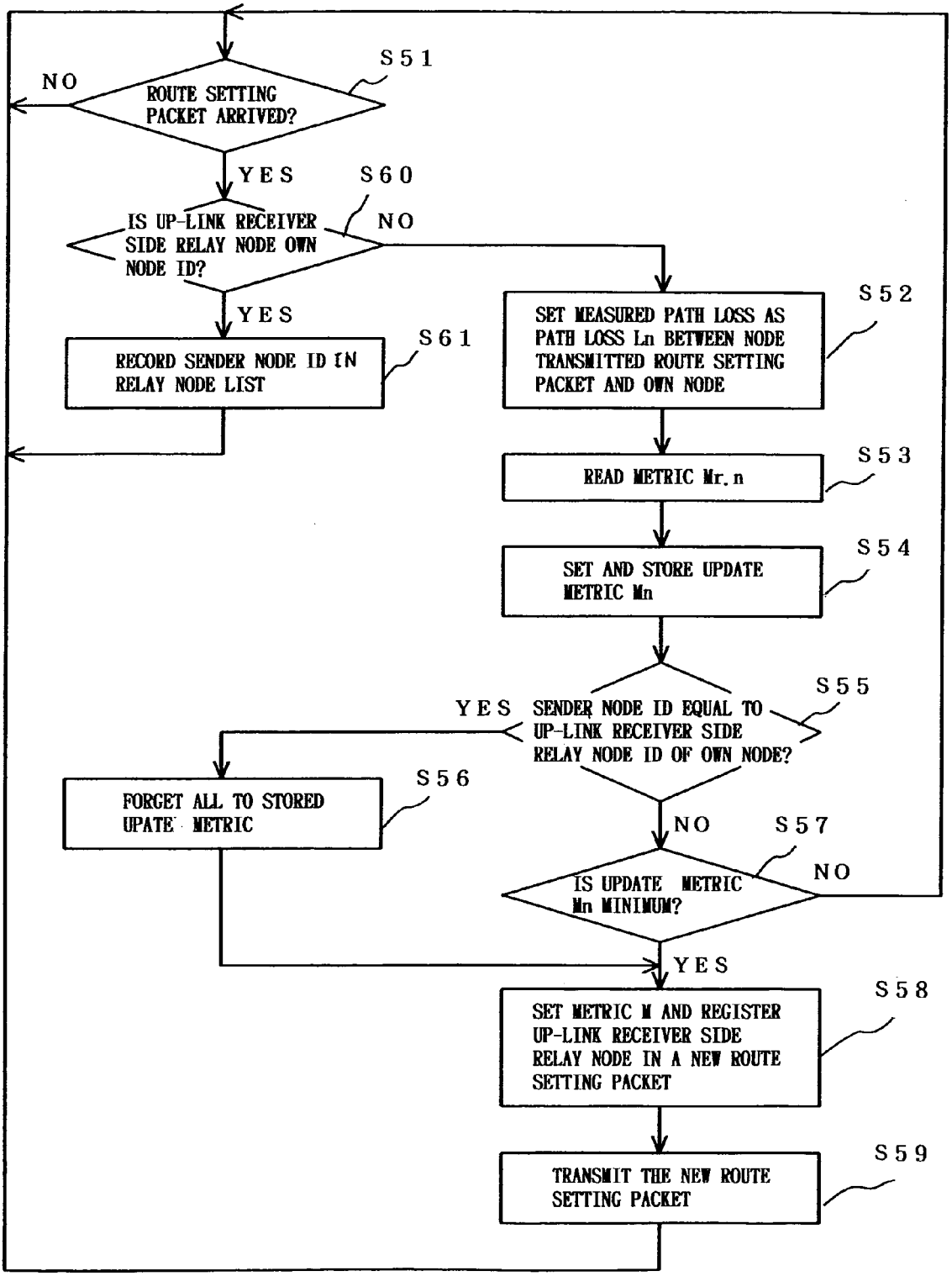
FIG. 13 is a flowchart showing one example of the relay route setting process to be executed in each relay node in another embodiment of the present invention.

FIG. 13 is a flowchart showing one example of the relay route setting process to be executed in each relay node in another embodiment of the present invention. In this embodiment of the present invention, a similar construction as the one embodiment of the cellular system of the present invention shown in FIG. 1 is used. The structure of the route setting packet to be used in the operation thereof is similar to the structure described in the embodiment of the route setting packet as shown in FIG. 2. With reference to FIGS. 1, 2 and 13, the updating method of the metric A01 and receiver side relay node selection procedure based on the metric in another embodiment of the present invention is now discussed.

Transmission of the route setting packet is initially performed by the core node 103. The relay route setting packet transmitted from the core node 103 to the unspecified relay nodes 104 to 106.

The metric contained in the route setting packet transmitted by the core node 103 is set to zero. The transmission interval of the route setting packet is set to be constant, to be random, or is set in response to the command from the server on the wired backbone network.

At first, the relay nodes 104 to 106 checks whether the route setting packet arrived or not (step S51 of FIG. 13). If the route setting packet does not arrive, the process returns to step S51.

The relay nodes 104 to 106 use carrier sense or the like for detection of arrival of the route setting packet. When arrival of the route setting packet is detected (step S51 of FIG. 13), the relay node 104 to 106 makes reference to the up-link receiver side relay node ID included in the route setting packet to judge whether the up-link receiver side relay node ID matches with the own node ID (step S60 of FIG. 13).

When the receiver side relay node ID matches with the own node ID, the relay nodes 104 to 106 record the ID within the route setting packet which the node broadcasted, namely the sender node ID contained in the route setting packet in the relay node list (step S61 of FIG. 3).

The relay node list is a table indicating the down-link receiver side node index and is constructed as shown in FIG. 7. As noted above, the relay node list is used as a receiver side node list for the down-link data packet. Each receiver side relay node ID contained in the relay node list can be forgotten (erased) after elapse of a given time period. For instance, when a new relay node is added in the cell, when an existing node is moved, or when a new building is constructed in the cell, re-establishment of the relay route becomes necessary. In order to adapt to the re-established relay route, each receiver side relay node ID contained in the relay node list may be intentionally forgotten after expiration of the given time period.

If a judgment is made that the relay node ID does not match with the own node ID, the relay nodes 104 to 106 takes a path loss as measured at the timing of judgment, as a path loss $L_n$ (n is the specific number of the sender node of the route setting packet) between the node that broadcasted the route setting packet and the own node (step S62 of FIG. 3). Measurement of the path loss is generally performed upon reception of the packet, irrespective of the content. For measurement of the path loss, reception power of the packet or the like may be used. In order to facilitate measurement of the path loss, transmission power of the route setting packet can be fixed. It should be noted that n represents a node number and the node number n is designated by the sender node ID contained in the route setting packet.

The relay nodes 104 to 106 read the metric Mr, n contained in the received route setting packet (step S53 of FIG. 3). Here, the metric Mr, n represents total of path loss in the set route. The set route represents a route from the sender node of the received route setting packet to the core node.

The relay nodes 104 to 106 set an update metric Mn from the transmission loss Ln measured at step S52 and the metric Mr, n. Here, the update metric Mn is given as a sum of the path loss Ln and the metric Mr, n. The relay nodes 104 to 106 store the update metric Mn calculated through the foregoing process (step S54 of FIG. 3).

After setting the update metric Mn, if the sender node ID contained in the currently received route setting packet matches with the current up-link receiver side node ID of own node (step S55 of FIG. 13), the metric M to be contained in the field of the metric A04 with the update metric Mn and the node indicated by the sender node ID of the currently arrived route setting packet is registered as the receiver side relay node (step S58 of FIG. 13) after forgetting all of the stored update metric (step S56 of FIG. 13), Thus, up-link receiver side node is only at each node.

The relay nodes 104 to 106 set the metric M set as set forth above as metric and transmit the route setting packet with the necessary information in respect to other items shown in FIG. 2 (step S59 of FIG. 13).

On the other hand, when the sender node ID, contained in the currently received route setting packet, does not match with the current up-link receiver side relay node ID (step S55 of FIG. 13), the update metric corresponding to the route setting packet received in the past is compared with the newly obtained update metric Mn (step S57 of FIG. 13).

If the update metric Mn is minimum, the metric M to be contained in the field of the metric A04 is set with the update metric Mn, and the node indicated by the sender node ID of the currently arrived route setting packet is registered as the up-link receiver side relay node (step S58 of FIG. 13). Thus, the up-link receiver side node is only at each node.

The relay nodes 104 to 106 set the transmission metric M set, as set forth above, as metric to transmit the route setting packet containing information necessary for each item shown in FIG. 2 (step S59 of FIG. 13). It should be noted that, if the update metric is minimum, the process returns to step S51.

By forgetting (erasing) the update metric stored in each node and the receiver side relay node ID contained in the relay node list, re-establishment of the relay route becomes possible in case that modification of the relay route becomes necessary due to a variation of the path loss between the nodes and addition or deletion or the like of the relay node.

Alternatively, when the route setting packet that is transmitted from the current up-link receiver side relay node is received, all of stored update metrics corresponding to the past received route setting packets are forgotten in the relay node. Transferring new update metric information calculated from the metric contained in the route setting packet to the route setting packet as new metric is performed to promote updating of the route setting. Thus, it becomes possible to adapt for a variation of the path loss in the current relay route.

In the cellular system according to another embodiment of the present invention, since the relay node is stationary arranged as an infrastructure, in contrast with the ad hoc network in which the moving terminal also serves as relay station, more stable communication can be performed. On the other hand, in the present invention, both the terminated node of the up-link and the start node of the down-link on the relay route are core nodes. Therefore, in comparison with route setting in an ad hoc network or the like, the amount of memory, and the complexity of the route setting method can be reduced.

By controlling the transmission power of the uplink data packet or the downlink data packet, the interference to the nodes and the terminal station can be reduced. As a result, the capacity of the whole system can be improved.

In the radio network in the present invention, the radio frequency band to be used for relaying packets between the core node and the relay node, and between the relay nodes and the radio frequency band to be used for an access transmission to be performed between the core node and the terminal station or between the relay node and the terminal station, can be the same or different. In a transmission between a semi-stationary arranged core node and a relay node, a relatively high frequency can be used, such as a submillimeter wave, millimeter wave or the like. Because there are relatively large margins in frequency resources, it becomes possible to use radio waves having straight transmission characteristrics. On the other hand, in transmission between the moving terminal station and the core node or between the relay nodes, a relatively low frequency band, such as a microwave band, is used to permit large capacity relaying, and to permit access transmission capable of non line-of-sight communication.

In the embodiment set forth above, it is premised that while a radio wave is used in relaying and accessing transmission, infrared light, light or the like can be used in place of the radio wave.

Figure 14:
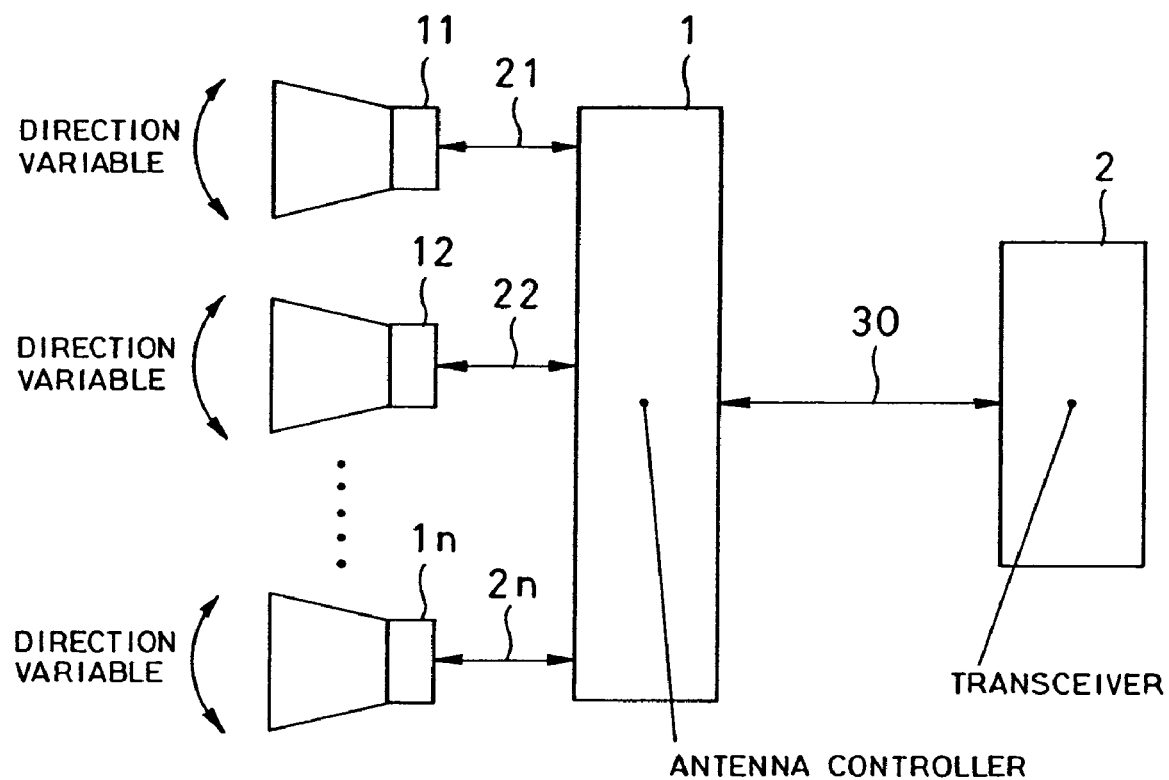
FIG. 14 is a block diagram showing a construction of the node to be used in one and another embodiments of the present invention.

FIG. 14 is a block diagram showing a construction of the node to be used in at least one embodiment of the present invention. In FIG. 14, the shown nodes are provided with directional antennas 11 to 1n. The directional antennas 11 to In are connected to an antenna controller 1 through signal lines 21 to 2n to permit control of respective directionality by the antenna controller 1. Through the signal lines 21 to 2n, transmission of the transmission and reception signals, and transmission of the control signal instructing the antenna direction are performed.

The antenna controller 1 is connected to a transceiver 2 via a signal line 30 for transmission of the data signal and the control signal there through. The antenna controller 1 performs selecting control or combining control of the transmission and reception antenna. In the transceiver, demodulation of the received data signal, modulation of the transmission signal and so forth are unitarily processed.

In the construction shown in FIG. 14, a plurality of antennas are selected and used for one transceiver 2. However, it is also possible to perform a plurality of transmissions simultaneously by using the independent transceiver for each antenna.

As set forth above, by using the directional antennas 11 to in, it becomes possible to compensate for significant distance attenuation which can be caused by using a high frequency, such as millimeter wave to obtain large gain.

Since the present invention is directed to a network adaptively setting routes on the basis of the metrics from peripheral nodes, large gain can be obtained with respect to the node selected as route and can reduce interference for the nodes located nearby, but out of the route, by directing the transmission direction of the directional antennas 11 to In toward the node selected as the route. On the other hand, concerning the route setting packet, a non-directional antenna may be used for widely broadcasting to adjacent nodes.

Figure 15:
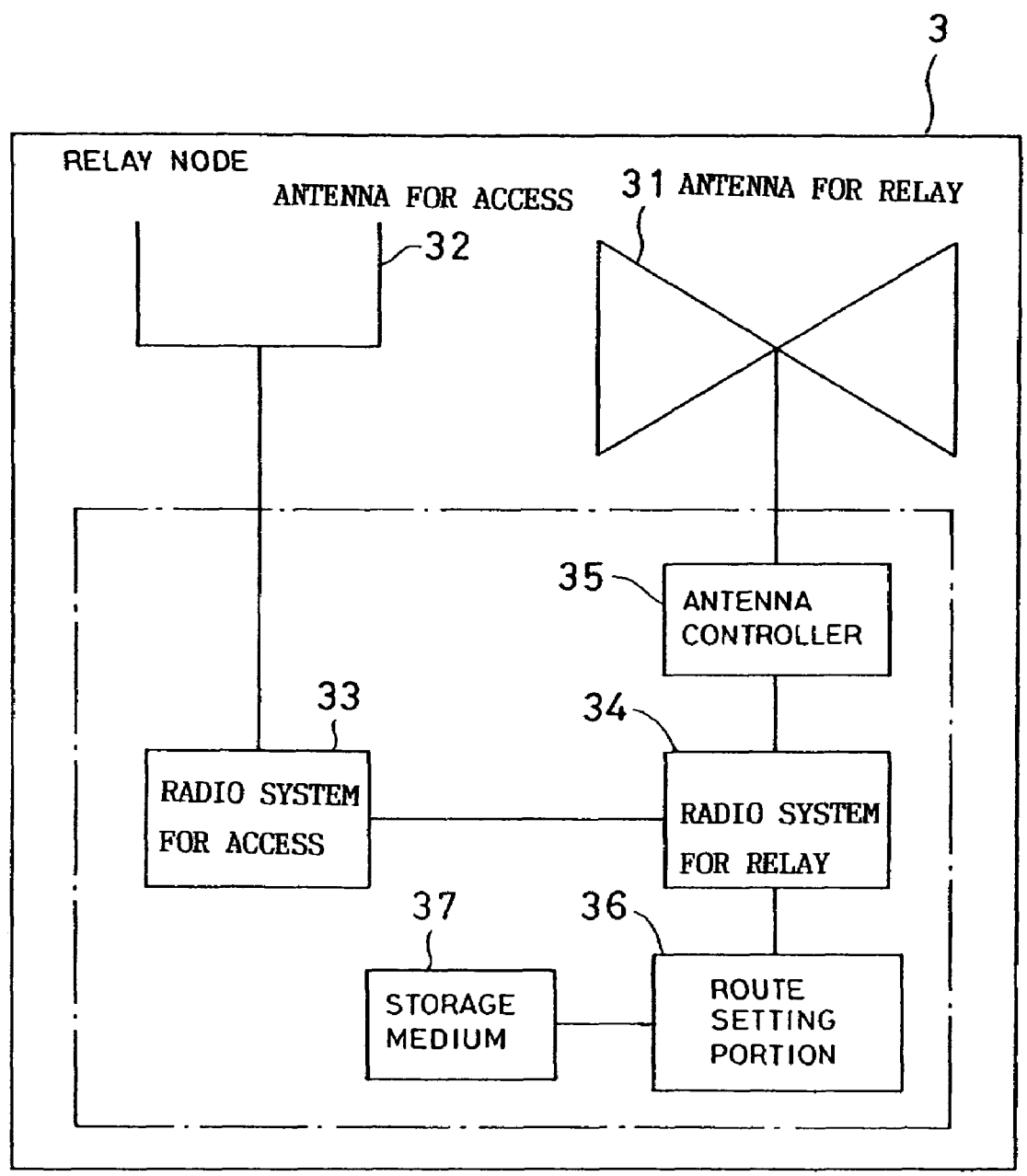
FIG. 15 is a block diagram showing a construction of the relay node to be used in one and another embodiments of the present invention.

FIG. 15 is a block diagram showing a construction of the relay node to be used in one and another embodiments of the present invention. In FIG. 15, a construction of the relay node 3 is shown in the case where different radio frequency bands are used for access transmission and relaying. In this case, the relay node 3 is provided with an antenna for access 32 and an antenna for relay 31, and a radio system for access 33 and a radio for relay system 34.

The radio system for access 33 and the radio system for relay 34 includes modulator and demodulator, encoding and decoding devices and so forth. The radio system for access 33 and the radio system for relay 34 can exchange a signal therebetween. The radio system for relay 34 performs relaying on the basis of the route set by any one of the embodiments of the invention combined with another embodiment of the invention. It should be noted that, in the route setting portion 36, setting of the route by any one of the one embodiment of the invention and another embodiment of the invention is performed by a program stored in a storage medium 37.

A manner of transmission of an up-link traffic directed from the terminal station to the wired backbone network is now discussed. The up-link traffic from the terminal station generated in the cell of the own node is received by the access transmission antenna 32. The up-link traffic is processed by the accessing radio system 33 and is input to the radio system for relay 34. The radio system for relay 34 transmits the up-link traffic toward the up-link receiver side relay node using the antenna controller 35 and the antenna for relay 31.

An operation for relaying the packet from the terminal station generated in the cell of another relay node is now discussed. Included in the following discussion is the operation in the relay node included in the route to the core node, in which the terminal station that generated the packet belongs. When the packet from the terminal station is to be relayed, the up-link data packet is initially received by the antenna for relay 31. The received signal is input to the radio system for relay 34. Then, operation as shown in FIG. 6 is performed. When relaying of the packet is decided, the radio system for relay 34 transmits the up-link traffic toward the up-link receiver side relay node using the antenna controller 35 and the antenna for relay 31.

Subsequently, discussion will be given for a manner of transmission of the down-link traffic from the wired backbone network to the terminal station. The down-link traffic is at first received by the antenna for relay 31 and is input to the radio system for relay 34 through the antenna controller 35. The radio system for relay 34 inputs the down-link traffic to the radio system for access 33 when the received down-link traffic is address to the terminal in the cell of the own node, and otherwise, the down-link receiver side relay node is determined on the basis of the destination of the down-link packet and transmits the packet through the antenna controller 35 and the antenna for relay 31. The radio system for access 33 is responsive to input of the down-link traffic to transmit the same to the terminal station through the antenna for access 32.

Figure 16:
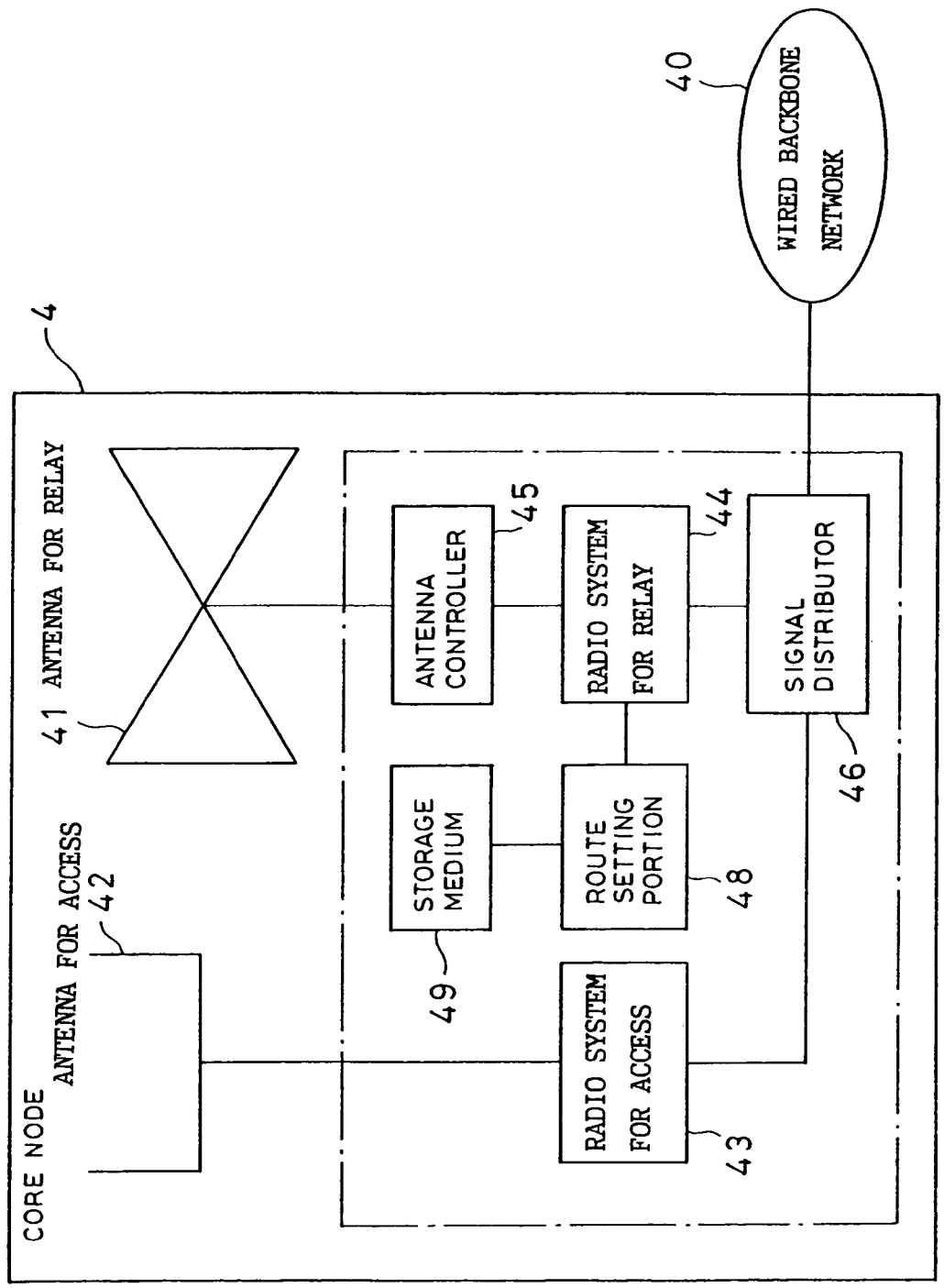
FIG. 16 is a block diagram showing a construction of the core node to be used in one and another embodiments of the present invention.

FIG. 16 is a block diagram showing a construction of the core node to be used in one embodiment and one other embodiment of the present invention. In FIG. 16, there is shown a construction of the core node in the case where different radio frequency bands for access transmission and elays are utilized. The core node 4 has similar construction as the relay node 3, but is differentiated from the relay node as connected to the wired backbone network. A signal distributor 46 in the core node 4 is connected to the wired backbone network 40, the radio system for access 43 and the radio system for relay 44, respectively.

The radio system for relay 44 performs relaying based on the route set by any one of the embodiments of the invention and another embodiment of the invention by a route setting portion 48. It should be noted that, in the route setting portion 48, setting of the route by any one of the one embodiment of the invention and another embodiment of the invention is performed by a program stored in a storage medium 49.

At first, discussion will be given for a manner of transmission of an up-link traffic directed from the terminal station to the wired backbone network 40. The up-link traffic from the terminal station generated in the cell is received by the access antenna for access 42, processed by the radio system for access 43 and is input to the signal distributor 46. The signal distributor 46 transmits the up-link traffic to the wired backbone network 40.

Next, discussion will be given for operation for relaying the packet from the terminal station generated in the cell of other relay node. Namely, in the following discussion, operation in the case where the packet from the relay node in which the terminal transmitted the packet belongs, reaches the core node is indicated. When the packet from the terminal station is to be relayed, at first, the up-link data packet is received by the antenna for relay 41. The received signal is input to the relaying radio system 44. When confirmation is made that the received packet is an up-link packet, the packet is transmitted to the wired backbone network through the signal distributor 46.

Subsequently, discussion will be given for a manner of transmission of the down-link traffic from the wired backbone network 40 to the terminal station. The down-link traffic is at first input to the signal distributor 46. The signal distributor 46 makes judgment of the input down-link traffic. If the down-link traffic is addressed to the terminal station within the cell of the own node, the traffic is input to the radio system for access 43, and otherwise, is input to the radio system for relay 44. When the down-link traffic is input to the radio system for access 43, the traffic is transmitted to the terminal station through the antenna for access 42. Then the down-link traffic is input to the radio system for relay 44, the traffic is transmitted to the other relay node through the antenna for relay 41.

In one embodiment of the present invention, upon updating of path loss as metric, new metric is constantly derived by adding the measured transmission loss Ln between the node that transmitted the route setting packet and the own node to the metric Mr, n contained in the route setting packet. However, it is also possible to generate the update metric by multiplying the received metric and the measured path loss by a weighting coefficient having a value in a range of 0 to 1. Namely, as weighting coefficient ∀, new update metric is derived by (Mr, n)×∀+Ln×(1−∀). With taking the value of ∀ as 0.5, it becomes equivalent to the case where weighting is not provided and is effective for reducing transmission power in the overall system. On the other hand, by setting the value of ∀ as zero, instead of path loss from the core node, only path loss between the immediately adjacent node is considered to be effective for lowering of the transmission power in each node. Thus, by performing weighting upon updating of the metric, characteristics of the route can be varied flexibly.

On the other hand, while one embodiment of the present invention has been discussed using only path loss as metric, it is possible to use two kinds of metrics. Namely, by providing two metrics of the first metric and the second metric, when the first metrics for multiple routes are the same, judgment is made by comparing the second metric for respective routes.

For example, the first metric is set a total of hop count and the second metric is set a total of the path loss. Then, hop count as the first metric is the same and minimum, one route having smaller path loss is taken as second metric as up-link side route to transmit new route setting packet and to set the up-link receiver side relay node.

By this, more detailed route setting becomes possible to permit selection of the route having small path loss with restricting increase of delay to be caused by increasing of the hop count to restrict interference.

As set forth above, by using two kinds of metrics, characteristics of the generated route can be defined in detail to make the network close to those expected by a designer.

On the other hand, when two kinds of metrics are used, upon making judgment as the same metric, width is provided for the judgment reference to make the metric falling within a defined range as the same metric. Namely, metrics to be considered as comparable extent are considered as the same to relay on judgment of the second metric. Discussion will be given hereinafter in the case where the path loss is classified into reference per 10 dB (0 to 10 dB, 10 to 20 dB, . . . ) with taking total of path loss as first metric and total hop count as second metric, for example.

Assuming that three routes, route A, route B and route C respectively having first and second metrics, route A=(81 dB, 3 hops), route B=(85 dB, 2 hops) and route C=(103 dB, 2 hops), are present. Initially, the first metrics are compared. In the shown case, while magnitudes of the path losses per se are different between the route A and the route B, in view of the reference of 10 dB unit, both fall within a reference value range of 80 to 90 dB. Therefore, the first metrics in the route A and the route B can be regarded as same. The route C has greater magnitude of path loss than those of the routes A and B even in view of the reference range of 10 dB unit. Therefore, the route C is not selected. Concerning the routes A and B judged to have the same metric, two metrics are compared. Since the route B has smaller hop count, i.e. second metric, the route B is selected as the route.

As set forth, when two metrics are used, by providing width in the reference range upon making judgment of large and small of the metric, two metrics are appropriately used to permit generation of an appropriate route.

By combining a method for multiplying weighting coefficient to the metric and a method using two kinds of metrics, the following operation can be considered, for example. Among two kinds of metrics, the hop count is taken as first metric. On the other hand, as second metric, with taking the path loss set forth above is taken as reference. Upon updating of metric, with taking weighting coefficient ∀ for hop count as first metric to be ∀=0.5, and 0.5 is constantly added upon updating of metric (since hop count is constantly increased by one, 1×0.5=0.5 is used), and as weighting coefficient ∀ for path loss as second metric to be ∃=0, the measured path loss per se is used as the update metric.

Namely, in FIGS. 3 and 13 showing the relay route setting process, the metric Mr, n to be read at step S3 or step S53 represents a total of the hop number from the core node as the first metric and the path loss as second metric. Updating of metric at step S4 or S54 is performed respectively for the first metric and the second metric to obtain the update metric Mn.

By comparing the first update metric obtained from this result, and the first update metric corresponding to the route setting packet from the other node received in the past, the metric M is set in the update metric Mn. The update metric Mn is set when the newly obtained first update metric is minimum or the same as the minimum value of the first update metric corresponding to the route setting packet from the other node received in the past, and when the second update metric is smaller than the second metric corresponding to the route having the minimum value of the first update metric, and the node indicated by the sender node ID of the currently received set packet is registered as an up-link receiver side relay node.

Figure 17:
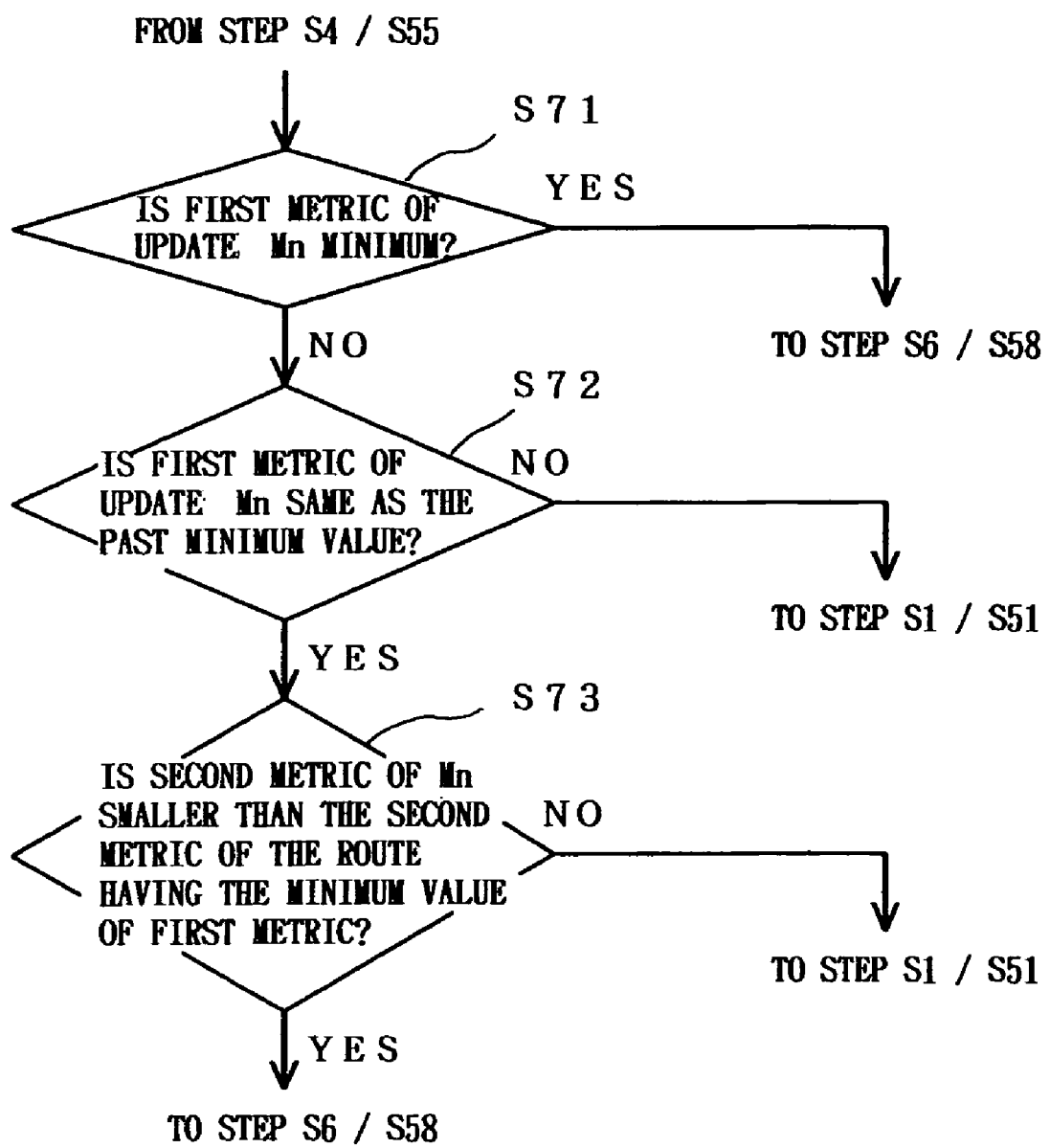
FIG. 17 is a flowchart showing an example of another process in a part of the relay route setting process in one and another embodiments of the present invention.

Namely, in FIGS. 3 and 13, upon judgment of minimum metric at step S5 or step S7, two kinds of metrics are used as set forth above. FIG. 17 shows a flowchart showing the operation. Steps S71 to S73 shown in FIG. 17 are replacement of step S5 or S57 in FIG. 3 or FIG. 13. For example, it is assumed as combination of the first metric and the second metric, three routes, route A=(3 hops, 100 dB), route B (3 hops, 91 dB) and route C (4 hops, 85 dB) are present. At first, the route C having large hop count as the first metric is eliminated. Subsequently, by comparing the second metrics, the route B is selected.

Figure 18:
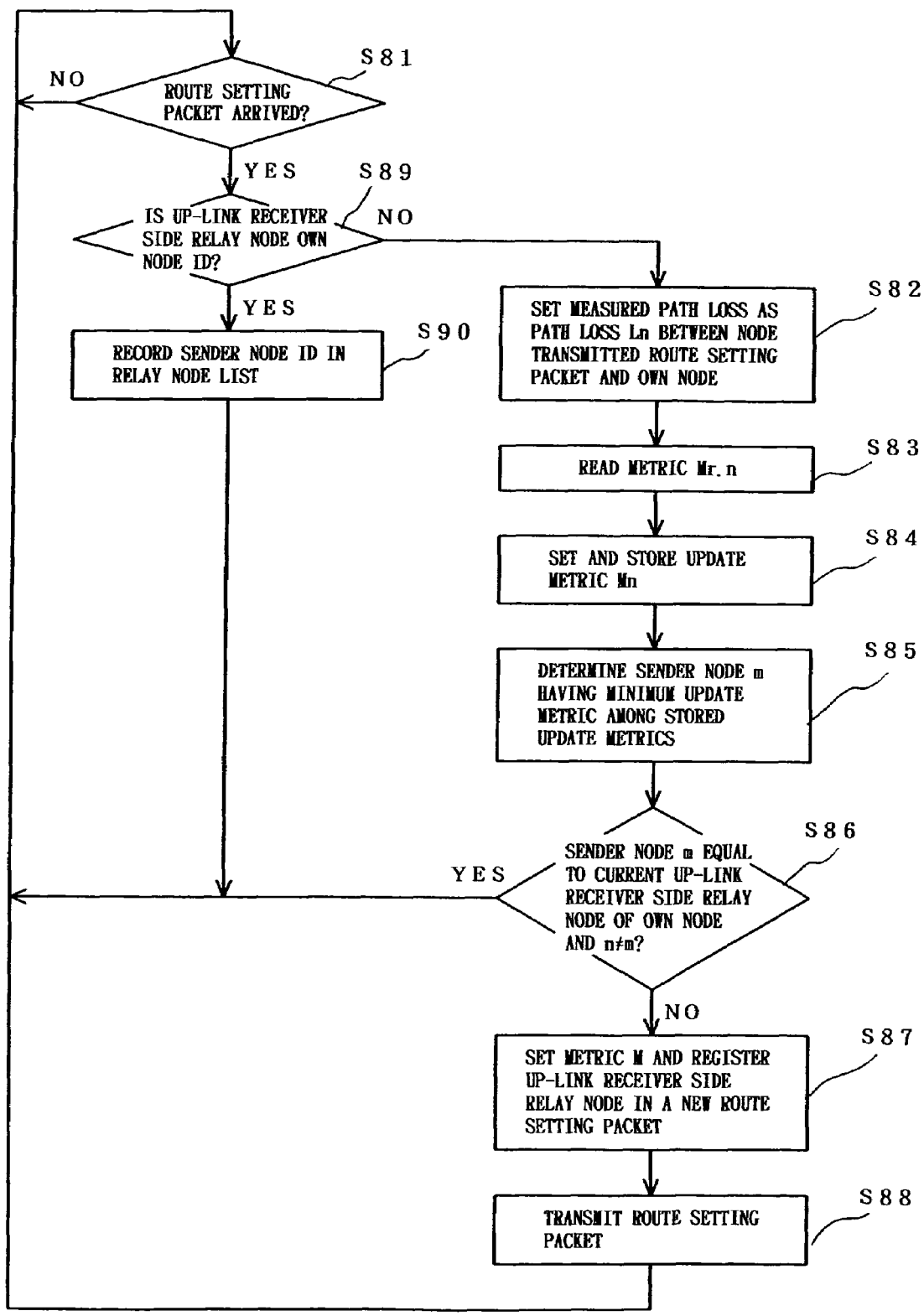
FIG. 18 is a flowchart showing one example of the relay route setting process to be executed in each relay node in a further embodiment of the present invention.

FIG. 18 is a flowchart showing one example of the relay route setting process to be executed in each relay node in a further embodiment of the present invention. The further embodiment of the present invention has a similar construction as the embodiment of the cellular system shown in FIG. 1. A structure of the route setting packet used in the operation of the further embodiment of the present invention is similar to the structure of the route setting packet in one embodiment of the present invention shown in FIG. 2. The updating method of the metric A04 and receiver side relay node selection procedure in the amount of the metric in the further embodiment of the present invention will be discussed with reference to FIGS. 1, 2 and 18.

The transmission of the route setting packet is initially performed by the core node 103. The relay route setting packet transmitted from the core node 103 is relayed to unspecified relay nodes 104 to 106.

The metric contained in the route setting packet transmitted by the core node 103 is set to zero, when a transmission interval of the route setting packet can be constant, random or on-demand in response to a command from the server on the wired backbone network 101.

At first, the relay nodes 104 to 106 check whether the route setting packet arrived or not (step S81 of FIG. 18). If the route setting packet is not detected, the process returns to step S81.

For detection of arrival of the route setting packet in the relay nodes 104 to 106, carrier sense or the like is used. When arrival of the route setting packet is detected (step S81 of FIG. 18), the relay nodes 104 to 106 make reference to the receiver side relay node ID contained in the route setting packet for checking whether the receiver side relay node ID matches with the own node ID (step S89 of FIG. 18).

When the receiver side relay node ID matches with the own node ID, the relay nodes 104 to 106 record the ID of the node broadcasted in the route setting packet, namely the sender node ID contained in the route setting packet in the relay node list (step S90 of FIG. 18).

The relay node list is a table indicating the down-link receiver side node number and is constructed as shown in FIG. 7. The relay node list is used as a receiver side node list upon the down-link data packet relaying which was discussed before. Each receiver side relay node ID contained in the relay node list can be forgotten (erased) after elapse of a given time period. For example, when a new relay node is added in the cell, an existing node is moved or when a new building is constructed in the cell, re-establishment of the relay route becomes necessary. In order to adapt to re-establish a relay route, each receiver side relay node ID contained in the relay node list may be intentionally forgotten after expiration of the given time period.

If a judgment is made that the relay node ID does not match with the own node ID, the relay nodes 104 to 106 takes a path loss as measured at the timing of judgment, as a path loss Ln (n is the specific number of the sender node of the route setting packet) between the node broadcasted in the route setting packet and the own node (step S82 of FIG. 18). Measurement of the path loss is generally performed upon reception of the packet, irrespective of the content. For measurement of the path loss, reception power of the packet or the like may be used. In order to facilitate measurement of the path loss, transmission power of the route setting packet can be fixed. It should be noted that n represents a node number and the node number n is designated by the sender node ID contained in the route setting packet, as shown in FIG. 2.

The relay nodes 104 to 106 read the metric Mr, n contained in the received route setting packet (step S83 of FIG. 18). Here, the update metric Mr, n is given as a sum of the path loss. The relay nodes 104 to 106 designate the update metric Mn from the path loss Ln and the metric Mr, n measured in step S82. Here, the update metric Mn is given by the sum of the transmission loss Ln and the metric Mr, n. The relay nodes 104 to 106 store the update metric Mn calculated through the foregoing process (step S84 of FIG. 18).

It should be noted that, among stored update metric, the update metric maintained for a period in excess of a given period can be forgotten (erased). On the other hand, the stored metric is always the most recent one. Namely, when the update metric corresponding to the node n as the sender of the route setting packet was stored in the past, the old metric is re-written with the new update metric obtained at step S84.

The relay nodes 104 to 106 compare the update metric Mn with update metric corresponding to all route setting packets received in the past to determine the sender node m (m is the number specific to the node) as the smallest metric (step S85 of FIG. 18). If the sender node m is the same as the current up-link receiver side relay node of own node and n m (step S86 of FIG. 18), the process is returned to step S81 and transmission of the route setting packet is not newly performed.

If the sender node m having the minimum metric is not the same as the current up-link receiver side node, or n=m (step S86 of FIG. 18), the update metric Mn is set in the metric M contained in the metric A04, and the sender node m is registered as the up-link receiver side relay node of own node (step S87 of FIG. 18). Namely, the route setting packet is transmitted when the up-link receiver side relay node is changed or when the route setting packet is received from the same up-link receiver side relay node even if up-link receiver side relay node is not changed.

The relay nodes 104 to 106 set the metric M set, as set forth above, as metric and transmit the route setting packet including the necessary information respective of other items shown in FIG. 2 (step S88 of FIG. 18).

Upon reception of the route setting packet, the relay nodes 104 to 106 may return an acknowledgement signal for accuracy. Since the route setting packet is the control packet directed to unspecified node, the relay nodes 104 to 106 may receive acknowledgement signals from a plurality of nodes after transmission of the route setting packet. When the relay nodes 104 to 106 do not receive returned acknowledgement signal at all, re-transmission of the route setting packet may be performed.

Figure 19:
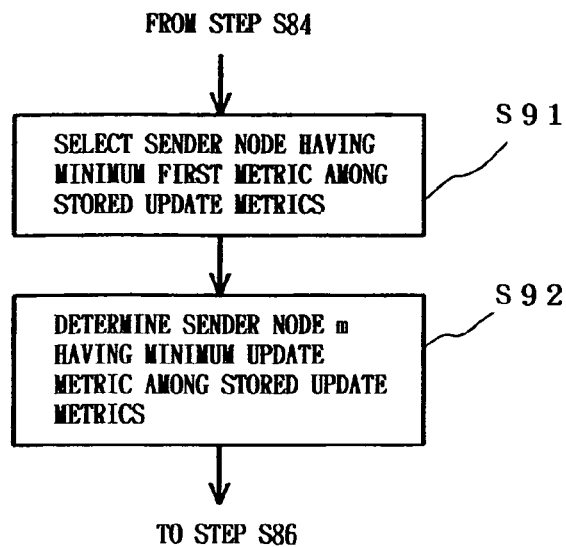
FIG. 19 is a flowchart showing an example of another process in a part of the relay route setting process in another embodiment of the present invention.
Figure 20:
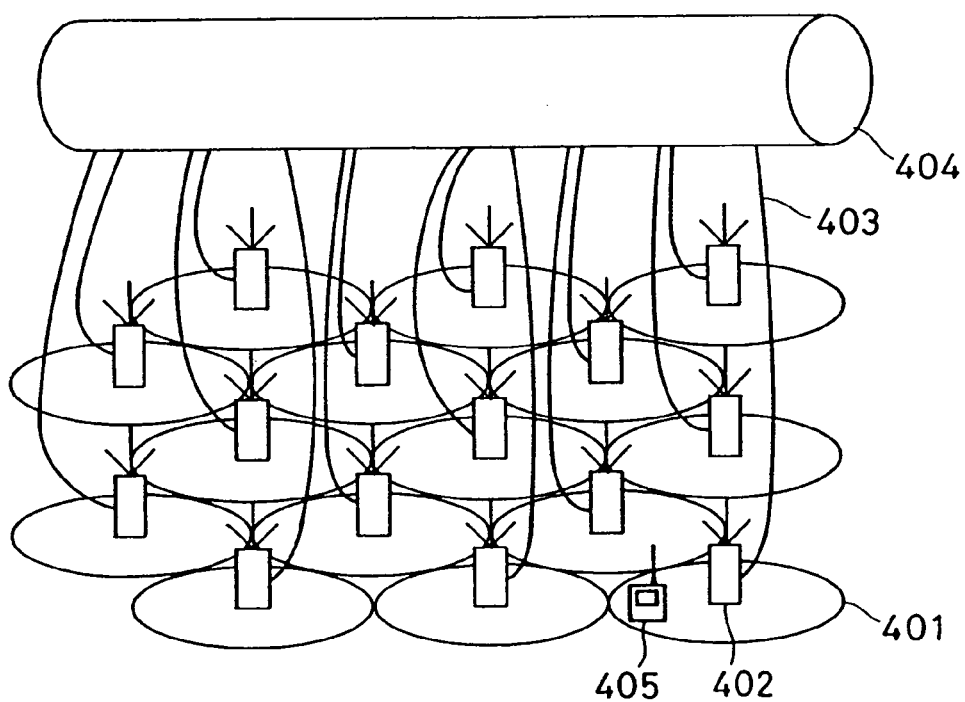
FIG. 20 is an illustration diagrammatically showing the conventional cellular system.

In FIG. 18, two kinds of metrics may be used, as set forth above, upon detection of the node having the minimum metric at step S85. FIG. 19 is a flowchart showing an example of another process in a part of the relay route setting process in another embodiment of the present invention. Therein steps S91 and S92, shown in FIG. 19, can replace step S85 in FIG. 18. For example, in case of combinations of the first and second metrics route A=(3 hops, 100 dB), route B (3 hops, 91 dB) and route C (4 hops, 85 dB) are present. At first, the route C having large hop count as the first metric is eliminated. Subsequently, by comparing the second metrics, the route B is selected.

As set forth above, the present invention can select the route having the minimum path loss in the entire relay route. The invention sets the relay route resistive against interference by selecting the relay nodes to have total path loss in at least one of the routes between the relay nodes and between the relay node and the core node, in the radio network including the core node connected to the wired network, the relay node relaying at least one of the down-link data packet transmitted from the core node and the up-link data packet, and a terminal station capable of transmission and reception of the data packet with the core node and the relay node.

On the other hand, the present invention uses two kinds of metrics while performing route control, and calculates update metric with weighting to permit more flexible route setting to facilitate generation of the route having characteristics expected by the network designer.

Although the present invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as being limited to the specific embodiment set out above, but to include all possible embodiments which can be embodied within a scope encompassed and equivalent thereof with respect to the features set out in the appended claims.

What is claimed is:

1. A radio network comprising:
a core node connected to a wired network;
relay nodes each relaying at least one of a down-link data packet transmitted front said core node and an up-link data packet directed toward said core node;
a terminal station capable of transmission and reception of data packet with both of said core node and said relay nodes,
a radio frequency band to be used in relaying communication data between said core node and said relay nodes and between said relay nodes and a radio frequency band to be used in access transmission of the communication data between said core node and said terminal station and between said relay node and said terminal station are different, and the radio frequency band to be used in relaying of the communication data is higher than the radio frequency band to be used in said access transmission of the communication data.

2. A radio network as set forth in claim 1, wherein each of said core node and said relay nodes has a plurality of directional antennas, each of said plurality of directional antennas is variable of transmitting direction, each of said core node and said relays nodes controls transmitting direction of its own directional antennas toward either of said core node and an adjacent one of said relay nodes.

3. A radio network as set forth in claim 2, wherein either or said core node and said relay nodes use a non-directional antenna upon transmission a route setting packet, and uses said directional antennas upon relaying of the data packet.

4. A relay node relaying at least one of a down-link data packet initially transmitted from a core node and an up-link data packet directed toward said core node, and capable of communication with a terminal station, comprising:
- antennas access transmission of communication data;
- an antenna for relaying of the communication data;
- a radio for access transmission of the communication data; and
- radio system for relaying of the communication data,
- a radio frequency hand to be used in relaying the communication data with said core node and a radio frequency band to be used in access transmission of the communication data with said terminal station are different, and the radio frequency band to be used in relaying the communication data is higher than the radio frequency band to be used in said access transmission of the communication data.

5. A relay node relaying at least one of a down-link data packet transmitted from a core node and an up-link data packet directed toward said core node, and capable of communication with a terminal station, a radio frequency band to be used in relaying communication data between said core node and said relay node and between said relay node and a radio frequency band to be used in access transmission of the communication data between said core node and said terminal station and between said relay node and said terminal station are different, and the radio frequency band to be used in relaying the communication data is higher than the radio frequency band to be used in said access transmission of the communication data.

6. A relay node as set forth in claim 5, wherein each of said core node and said relay node has a plurality of directional antennas, each of said plurality of directional antennas is variable of transmission direction, each of said core node and said relay node controls transmission direction of the directional antennas toward either of saw core node and an adjacent relay node.

7. A relay node as set forth in claim 6, which uses a non-directional antenna upon transmission of a route setting packet, and uses said directional antennas upon relaying of the data packet.

8. A core node capable of transmission and reception of data packet with either a relay node that performs radio relaying and a terminal station, and connected to a wired network, comprising:
- an antenna for access transmission of communication data;
- an antenna for relaying of the communication data;
- a radio system for access transmission of the communication data;
- a radio system for relaying of the communication data; and
- a signal distributor connected to a wired backbone network, a radio frequency band to be used in relaying the communication data with said relay node and a radio frequency band to used in access transmission of the communication data with said terminal station are different, and the radio frequency band to be used in relaying the communication data is higher than the radio frequency band to be used in said access transmission of the communication data.

9. A core node connected to a wired network, having relayed at least one of a down-link data packet transmitted from said core node and an up-link data packet directed toward said core node, and capable of transmission and reception of data packet with a terminal station, a radio frequency band to be used in relaying communication data with a relay node and a radio frequency band to be used in access transmission of the communication data with said terminal station are different, and the radio frequency band to be used in relaying is higher than the radio frequency band to be used in said access transmission.

10. A core node as set forth in claim 9, which has a plurality of directional antennas, each of said plurality of directional antennas is variable of transmitting direction, and controls transmitting direction of the directional antennas toward an adjacent relay node.

11. A core node as set forth in claim 10, which used a non-directional antenna upon transmission of a route setting packet, and used said directional antennas upon relaying of the data packet.

12. A relaying method for a system including a core node connected to a wired network, relay nodes each relaying at least one of a down-link data packet transmitted from said core node and an up-link data packet directed toward said core node, and a terminal station capable of transmission and reception of data packet with both of said core node and said relay node,
- a radio frequency band to be used in relaying communication data between said core node and said relay nodes and between said relay nodes and a radio frequency band to be used in access transmission of the communication data between said core node and said terminal station and between said relay node and said terminal station are different, and the radio frequency band to be used in relaying the communication data is higher than the radio frequency band to be used in said access transmission of the communication data.

13. A relaying method as set forth in claim 12, wherein each of said core node and said relay nodes has a plurality of directional antennas,
- each of said plurality of direction antennas is variable of transmitting direction,
- each of said core nodes and said relay node controls transmitting direction of its own directional antennas toward either of said core node and an adjacent one of said relay nodes.

14. A relaying method as set forth in claim 13, wherein either of said core node and said relay nodes uses a non-directional antenna upon transmission of a route setting packet, and uses said directional antenna upon relaying of the data packet.

* * * * *